(12) United States Patent
Peng et al.

(10) Patent No.: US 12,647,036 B2
(45) Date of Patent: Jun. 2, 2026

(54) POWER CONVERTER, CONTROLLER, AND METHOD OF CONTROLLING THE SAME

(71) Applicant: CHICONY POWER TECHNOLOGY CO., LTD., New Taipei City (TW)

(72) Inventors: Tso-Jen Peng, New Taipei City (TW); Mao-Song Pan, New Taipei City (TW); You-Jie Sung, New Taipei City (TW)

(73) Assignee: CHICONY POWER TECHNOLOGY CO., LTD., New Taipei City (TW)

( * ) Notice: Subject to any disclaimer, the term of this patent is extended or adjusted under 35 U.S.C. 154(b) by 213 days.

(21) Appl. No.: 18/733,501

(22) Filed: Jun. 4, 2024

(65) Prior Publication Data

US 2025/0300565 A1 Sep. 25, 2025

(30) Foreign Application Priority Data

Mar. 22, 2024 (TW) ................................. 113110803

(51) Int. Cl.
H02M 3/335 (2006.01)
H02M 1/08 (2006.01)
H02M 3/00 (2006.01)

(52) U.S. Cl.
CPC ......... *H02M 3/33569* (2013.01); *H02M 1/08* (2013.01); *H02M 3/01* (2021.05); *H02M 3/33571* (2021.05)

(58) Field of Classification Search
CPC .............. H02M 3/33569; H02M 3/01; H02M 3/33571; H02M 1/08
See application file for complete search history.

(56) References Cited

U.S. PATENT DOCUMENTS 7,660,133 B1 2/2010 Hwang et al.
10,770,979 B2 9/2020 Sato et al.
(Continued)

FOREIGN PATENT DOCUMENTS

CN 111052580 A 4/2020
CN 114204817 A 3/2022
(Continued)

OTHER PUBLICATIONS

Office Action dated Nov. 22, 2024 of the corresponding Taiwan patent application No. 113110803.

*Primary Examiner* — Lakaisha Jackson
(74) *Attorney, Agent, or Firm* — MUNCY, GEISSLER, OLDS & LOWE, P.C.

(57) ABSTRACT

A power converter includes a transformer, a resonant circuit, a switch circuit, a resonant adjustment circuit, and a controller. The transformer includes a primary-side winding, a secondary-side winding, and a magnetizing inductance. The resonant circuit includes a first resonant capacitor, and the switch circuit includes a first switch and a second switch. The resonant adjustment circuit is coupled to the first resonant capacitor, and the controller is coupled to the resonant adjustment circuit. The controller controls the resonant adjustment circuit to adjust a resonant current flowing through the first resonant capacitor according to an output voltage of the power converter so as to adjust a current value that when the resonant current and a magnetizing current flowing through the magnetizing inductance intersect to be substantially equal to a predetermined value.

20 Claims, 17 Drawing Sheets

(56)     References Cited

U.S. PATENT DOCUMENTS

| | | | |
|---|---|---|---|
| 11,005,379 | B1 | 5/2021 | Deboy et al. |
| 11,509,228 | B2 | 11/2022 | Deboy et al. |
| 2008/0259647 | A1 | 10/2008 | Risseeuw |
| 2015/0171754 | A1 | 6/2015 | Scibilia |
| 2015/0349627 | A1 * | 12/2015 | Lin ......................... H02M 3/01 |
| | | | 363/21.02 |
| 2020/0007043 | A1 * | 1/2020 | Miao ....................... H02M 3/01 |
| 2022/0060118 | A1 * | 2/2022 | Yoshizawa .......... H02M 1/0025 |
| 2022/0166327 | A1 * | 5/2022 | Liu ..................... H02M 1/0025 |

FOREIGN PATENT DOCUMENTS

| | | | |
|---|---|---|---|
| CN | 114884356 | A | 8/2022 |
| CN | 115036896 | A | 9/2022 |
| CN | 115995977 | A | 4/2023 |
| CN | 116599353 | A | 8/2023 |
| JP | 5987496 | B2 | 9/2016 |
| TW | 201114160 | A | 4/2011 |
| TW | 201735518 | A | 10/2017 |
| TW | 201840111 | A | 11/2018 |
| TW | 202201891 | A | 1/2022 |
| TW | 202312644 | A | 3/2023 |
| TW | 202322536 | A | 6/2023 |
| TW | 202337124 | A | 9/2023 |

* cited by examiner

POWER CONVERTER, CONTROLLER, AND METHOD OF CONTROLLING THE SAME

BACKGROUND

Technical Field

The present disclosure relates to a power converter, a controller, and a method of controlling the same, and more particularly to a power converter, a controller, and a method of controlling the same that can adjust resonance characteristics in real time under the full output voltage range.

Description of Related Art

The statements in this section merely provide background information related to the present disclosure and do not necessarily constitute prior art.

Under the application of USB PD3.1 fast charging standard, the charging power is increased from the original 100 W to 240 W, and supports a maximum voltage output of 48V, which means that the power supply needs to provide a voltage change of 5V to 48V. For the asymmetric half-bridge (AHB) structure, the advantage of variable voltage is beginning to be highlighted. The asymmetric half-bridge (AHG) flyback converter combines the advantages of zero-voltage switching on the primary side of the LLC resonant circuit structure and the wide voltage output of the flyback structure, and it is suitable for power conversion applications with high switching frequencies.

However, the inability to achieve high-efficiency operation across the entire output voltage range is a problem and technical bottleneck that deserves attention. Therefore, in order to solve the aforementioned problems, a parallel capacitor mechanism has been added. However, this method is only suitable for achieving higher efficiency at a single output voltage, and still cannot achieve operation with better conversion efficiency across the entire output voltage range.

Therefore, how to design a power converter, a controller, and a method of controlling the same to solve the problems and technical bottlenecks in the existing technology has become a critical topic in this field.

SUMMARY

An objective of the present disclosure is to provide a power converter. The power converter includes a transformer, a resonant circuit, a switch circuit, a resonant adjustment circuit, and a controller. The transformer includes a primary-side winding, a secondary-side winding, and a magnetizing inductance. The primary-side winding is coupled to the secondary-side winding, and the magnetizing inductance is connected to the primary-side winding in parallel. The resonant circuit is coupled to the primary-side winding, and the resonant circuit includes a first resonant capacitor. The switch circuit includes a first switch and a second switch, and a node between the first switch and the second switch coupled to the resonant circuit. The resonant adjustment circuit is coupled to the first resonant capacitor. The controller is coupled to the resonant adjustment circuit, and the controller controls the resonant adjustment circuit to adjust a resonant circuit flowing through the first resonant capacitor according to an output voltage of the power converter so as to adjust a current value when the resonant current and a magnetizing current flowing through the magnetizing inductance intersect to be substantially equal to a predetermined value.

In one embodiment, the resonant adjustment circuit includes a second resonant capacitor and a switch. The second resonant capacitor is coupled to the first resonant capacitor. The switch is coupled to the second resonant capacitor and the controller. The controller controls the switch to be turned on for a specific time according to the output voltage so as to adjust the current value to be substantially equal to the predetermined value.

In one embodiment, when the first switch is turned on, the controller controls the switch to be turned on for a first specific time according to the output voltage, and when the second switch is turned on, the controller controls the switch to be turned on for a second specific time.

In one embodiment, the controller controls the switch to be turned on for the specific time according to a junction diode of the switch being forward biased.

In one embodiment, after the controller waits for a delay time after the switch is turned on for the first specific time, and after the delay time, the controller controls the switch to be turned on for a second specific time.

In one embodiment, the controller calculates a specific duty cycle according to the output voltage, and control the switch to be turned on for the first specific time according to the specific duty cycle.

In one embodiment, the power converter further includes an auxiliar winding. The auxiliar winding is coupled to the controller, and the auxiliary winding generates an auxiliary voltage corresponding to the output voltage by coupling to the primary-side winding. The controller calculates a specific duty cycle according to the auxiliary voltage and a capacitor voltage of the first resonant capacitor, and control the switch to be turned on for the first specific time according to the specific duty cycle.

In one embodiment, the controller includes a computing unit, a first comparison unit, a compensation unit, and a first AND operation unit. The computing unit provides a voltage error value according to the auxiliary voltage and the capacitor voltage. The first comparison unit compares the voltage error value with a first reference voltage to generate an error signal. The compensation unit compensates the error signal to generate a voltage compensation signal. The first AND operation unit performs an and operation on the voltage compensation signal and a first control signal of controlling the first switch to generate a charging control signal. When the first switch is turned on, the controller controls the switch to be turned on or turned off according to the charging control signal.

In one embodiment, the controller includes a second comparison unit and a second AND operation unit. The second comparison unit compares a switch voltage of the switch with a second reference voltage to generate a voltage comparison signal. The second AND operation unit performs an and operation on the voltage comparison signal and a second control signal of controlling the second switch to generate a discharging control signal. After the second switch is turned on, the controller controls the switch to be turned on or turned off according to the discharging control signal.

In one embodiment, when the switch is turned off, a capacitance value of an equivalent capacitance of the resonant circuit is a capacitance value of the first resonant capacitor, and when the switch is turned on, the capacitance value is a capacitance value of the first resonant capacitor and the second resonant capacitor connected in parallel.

Another objective of the present disclosure is to provide a controller. The controller controls a power converter including a transformer, a resonant circuit, a switch circuit, and a resonant adjustment circuit. The controller includes a first detection terminal, a second detection terminal, and a control terminal. The first detection terminal is coupled to an auxiliary winding, and the auxiliary winding is coupled to the transformer to generate an auxiliary voltage, and the first detection terminal acquires an output voltage of the power converter by detecting the auxiliary voltage. The second detection terminal is coupled to a switch of the resonant adjustment circuit to detect a switch voltage of the switch. The control terminal is coupled to the switch, and configured to provide a switch control signal to control the switch to be turned on or turned off. The controller provides the switch control signal according to the auxiliary voltage and the switch voltage to adjust a resonant current flowing through the first resonant capacitor so ad to adjust a current value when the resonant current and a magnetizing current flowing through the magnetizing inductance of the transformer intersect to be substantially equal to a predetermined value.

In one embodiment, the controller calculates a specific duty cycle according to the auxiliary voltage, and adjust the switch control signal according to the specific duty cycle so that when the first switch is turned on, the controller controls the switch to be turned on for a second specific time according to the switch control signal.

In one embodiment, the controller further includes a third detection terminal. The third detection terminal is coupled to a first resonant capacitor of the resonant circuit, and detects a capacitor voltage of the first resonant capacitor. The controller provides the switch control signal to adjust the resonant current according to the auxiliary voltage, the capacitor voltage, and the switch voltage.

In one embodiment, the controller calculates a specific duty cycle according to the auxiliary voltage and the capacitor voltage, and adjusts the switch control signal according to the specific duty cycle so that when the first switch is turned on, the controller controls the switch to be turned on for a first specific time according to the switch control signal.

In one embodiment, the controller adjusts the switch control signal according to the switch voltage so that when the second switch is turned on, the controller controls the switch to be turned on for a second specific time according to the switch control signal.

Further another objective of the present disclosure is to provide a method of controlling a power converter including a transformer, a resonant circuit, a switch circuit, and a resonant adjustment circuit. The method includes steps of: controlling the switch circuit to control the power converter to convert an input voltage into an output voltage, and detecting the output voltage; detecting a first resonant capacitor of the resonant circuit to acquire a capacitor voltage of the first resonant capacitor; detecting a switch of the resonant adjustment circuit to acquire a switch voltage of the switch; providing a switch control signal to control the switch to be turned on or turned off according to the output voltage, the capacitor voltage, and the switch voltage so as to adjust a resonant current flowing through the first resonant capacitor.

In one embodiment, the power converter further includes an auxiliary winding, and the auxiliary winding coupled to the transformer to generate an auxiliary voltage, the method further comprises a step of: detecting the auxiliary voltage to acquire the output voltage corresponding to the auxiliary voltage.

In one embodiment, the method further includes steps of: calculating a specific duty cycle according to the output voltage; adjusting the switch control signal according to the specific duty cycle; controlling the switch to be turned on for a first specific time when a first switch of the switch circuit is turned on.

In one embodiment, the method further includes steps of: calculating a specific duty cycle according to the output voltage and the capacitor voltage; adjusting the switch control signal according to the specific duty cycle; controlling the switch to be turned on for a first specific time according to the switch control signal when a first switch of the switch circuit is turned on.

In one embodiment, the method further includes steps of: adjusting the switch control signal according to the switch voltage; controlling the switch to be turned on for a second specific time according to the switch control signal when a second switch of the switch circuit is turned on.

Therefore, the main purpose and effect of the present disclosure is that when the output voltage of the power converter is too low, the controller controls the resonant adjustment circuit to adjust the resonant current flowing through the first resonant capacitor according to the output voltage so as to adjust a current value when the resonant current and the magnetizing current intersect to be substantially equal to a predetermined value. Therefore, it is to achieve the effect of increasing energy transmission efficiency under the full output voltage range.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1A:
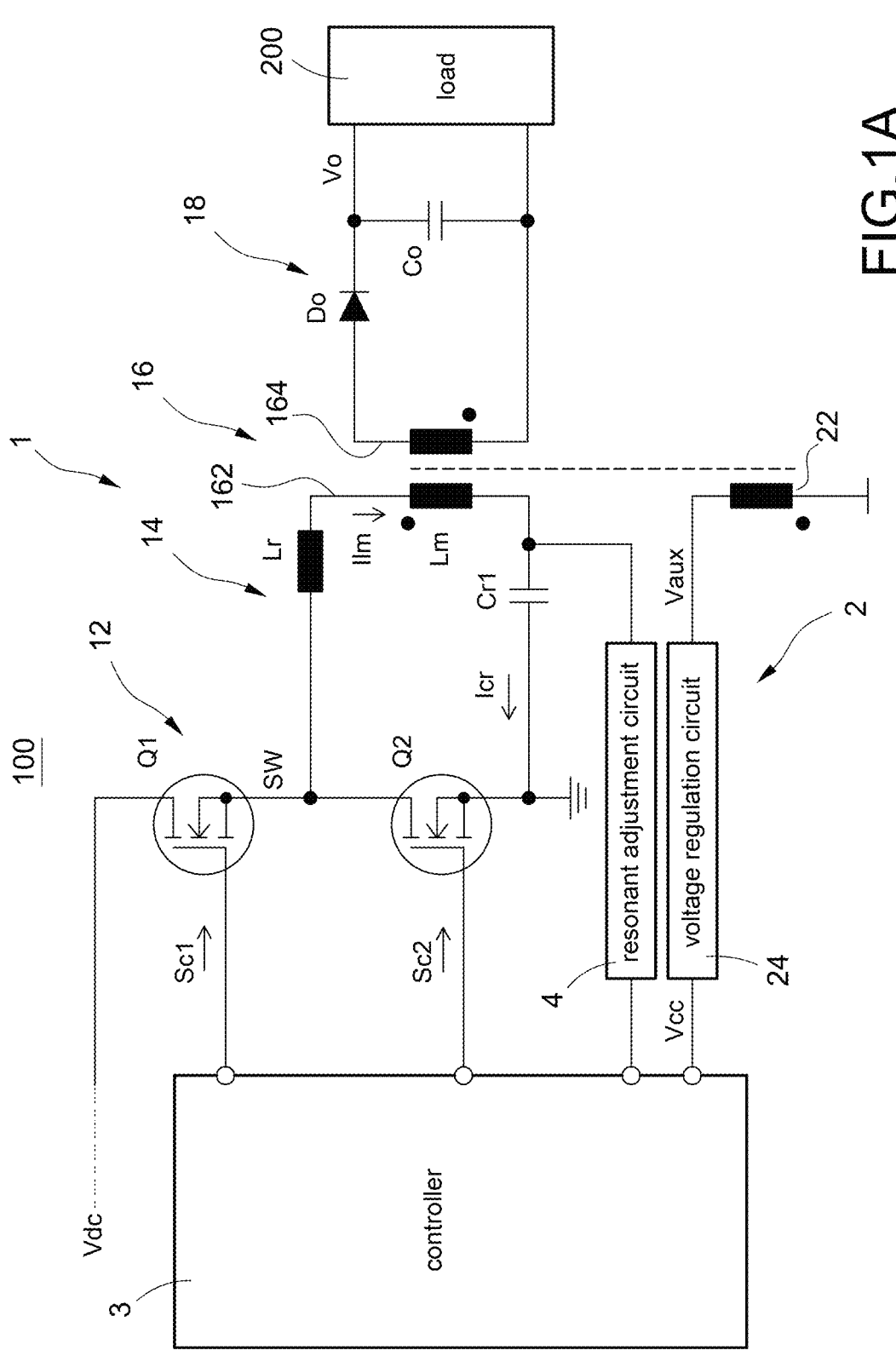
FIG. 1A is a block circuit diagram of an asymmetric half-bridge flyback power converter according to the present disclosure.

Reference will now be made to the drawing figures to describe the present disclosure in detail. It will be understood that the drawing figures and exemplified embodiments of present disclosure are not limited to the details thereof.

Please refer to FIG. 1A, which shows a block circuit diagram of an asymmetric half-bridge flyback power converter according to the present disclosure. The asymmetric half-bridge flyback power converter 100 (hereinafter abbreviated as "power converter 100") receives a direct-current (DC) voltage Vdc, and converters the DC voltage Vdc into an output voltage Vo to supply power to a load 200 coupled to a rear end. The power converter 100 includes a power conversion circuit 1, an auxiliary power supplying circuit 2, a controller 3, and a resonant adjustment circuit 4. The power conversion circuit 1 includes a switch circuit 12, a resonant circuit 14, a transformer 16, and a rectification circuit 18. In particular, there are various implementations of the rectification circuit 18, and here the rectification circuit 18 includes an output capacitor Co and an output diode Do as an example. The switch circuit 12 receives the DC voltage Vdc, and the switch circuit 12 includes a first switch Q1 and a second switch Q2 connected in series. The transformer 16 includes a primary-side winding 162, a secondary-side winding 164, and a magnetizing inductance Lm. The primary-side winding 162 is coupled to the secondary-side winding 164, and the magnetizing inductance Lm is connected to the primary-side winding 162 in parallel. In particular, the magnetizing inductance Lm may be an equivalent inductance formed by the primary-side winding 162, or an additional winding wound by the transformer 16.

One terminal of the resonant circuit 14 is coupled to a node SW between the first switch Q1 and the second switch Q2, and the other terminal of the resonant circuit 14 is coupled to the primary-side winding 162. In one embodiment, the resonant circuit 14 may include a resonant inductor Lr and a first resonant capacitor Cr1. One terminal of the resonant inductor Lr is coupled to the node SW between the first switch Q1 and the second switch Q2, and the other terminal of the resonant inductor Lr is coupled to one terminal of the primary-side winding 162. One terminal of the first resonant capacitor Cr1 is coupled to the second switch Q2 and a ground terminal, and the other terminal of the first resonant capacitor Cr1 is coupled to the other terminal of the primary-side winding 162. In one embodiment, it is not limited to the structure of the resonant circuit 14 mentioned above, that is, any circuit structure that can enable the resonant circuit 14 to produce a resonant function should be included in the scope of this embodiment. One terminal of the rectification circuit 18 is coupled to the secondary-side winding 164, and the other terminal of the rectification circuit 18 is coupled to the load 200 to provide the output voltage Vo to supply power to the load 200.

The auxiliary power supplying circuit 2 includes an auxiliary winding 22 and a voltage regulation circuit 24, and the auxiliary winding 22 is coupled to the primary-side winding 162. One terminal of the voltage regulation circuit 24 is coupled to the auxiliary winding 22, and the other terminal of the voltage regulation circuit 24 is coupled to the controller 3. The auxiliary winding 22 generates a winding voltage Vaux by coupling the primary-side winding 162, and the voltage regulation circuit 24 supplies power to the controller 3 according to a working voltage VCC provided by the winding voltage Vaux. Due to the turns ratio characteristics of the transformer 16, its coupled voltage and current have a corresponding proportional relationship. Therefore, the magnitude of the auxiliary voltage Vaux will have a positive proportional relationship with the magnitude of the output voltage Vo. The resonant adjustment circuit 4 is coupled to the first resonant capacitor Cr1, and the controller 3 is coupled to the first switch Q1, the second switch Q2, and the resonant adjustment circuit 4. The controller 3 provides pulse-width modulated control signals Sc1, Sc2 to respectively control the first switch Q1 and the second switch Q2 to be turned on or turned off so as to control the power conversion circuit 1 to convert the DC voltage Vdc into the output voltage Vo. Moreover, the controller 3 receives a feedback signal corresponding to the output voltage Vo, and adjusts the PWM signal according to the feedback signal so as to stabilize/regulate a voltage value of the output voltage Vo by adjusting the PWM signal. The output capacitor Co stores the output voltage Vo to provide the output voltage Vo to supply power to the load 200.

In one embodiment, the voltage regulation circuit 24 may be, for example, but not limited to, a diode used to reverse bias and cut off a negative voltage of the reverse auxiliary voltage Vaux. Alternatively, the voltage regulation circuit 24 may be a circuit that can stabilize/regulate the winding voltage Vaux, such as a low drop-out linear regulator (LDO) or a clamping circuit. In one embodiment, the controller 3 may be, for example but not limited to, a control chip such as a microcontroller (MCU) or a digital signal processor (DSP). However, the controller 3 is not excluded and may also be implemented by a control circuit, a logic circuit, and other devices.

Figure 1B:
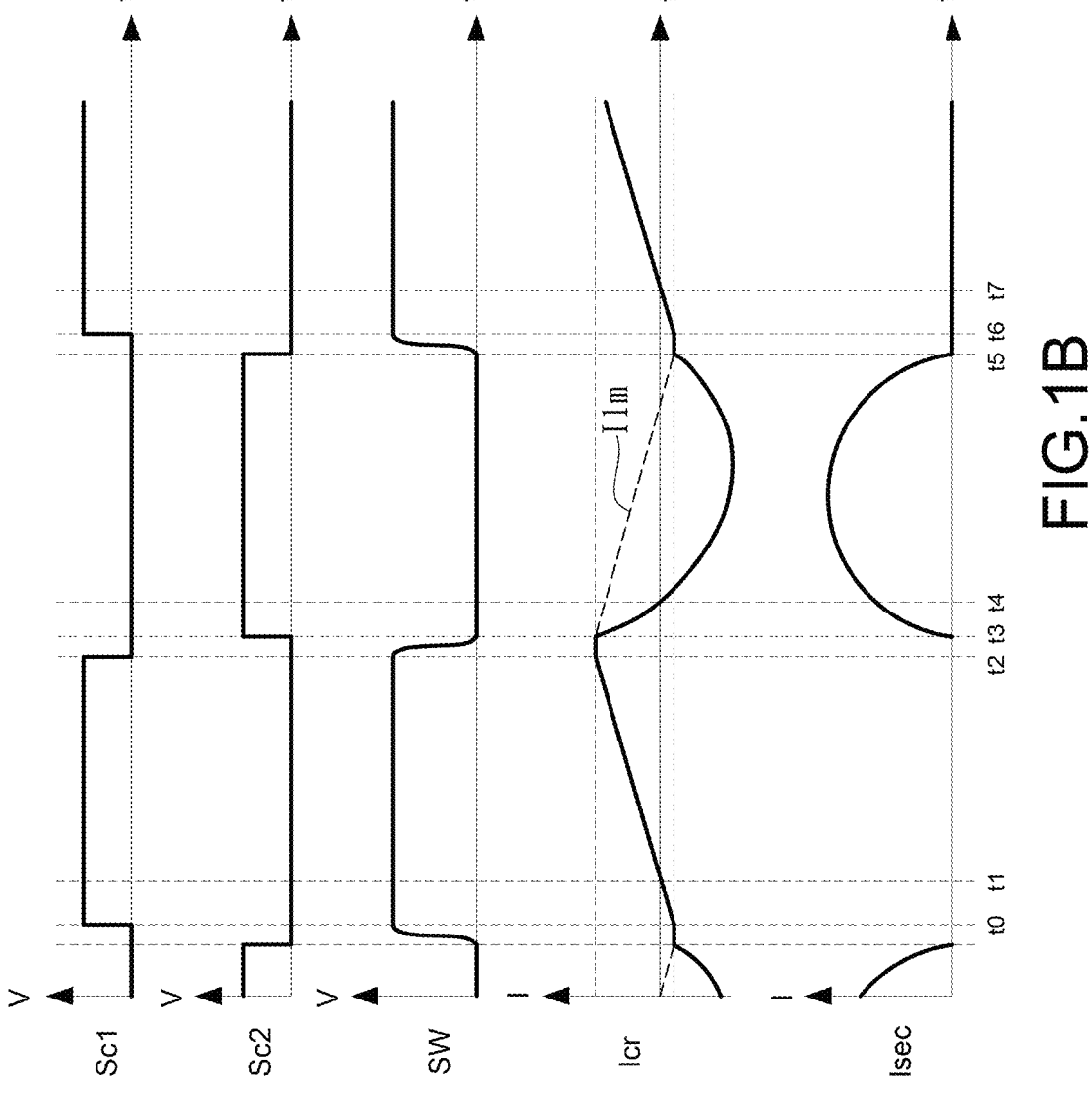
FIG. 1B is a timing waveform diagram of operating the asymmetric half-bridge flyback power converter in a continuous resonant mode according to the present disclosure.

Please refer to FIG. 1B, which shows a timing waveform diagram of operating the asymmetric half-bridge flyback power converter in a continuous resonant mode according to the present disclosure, also refer to FIG. 1A. When the power converter 100 operates in a continuous resonant mode and the first switch Q1 is turned on, the DC voltage Vdc charges the magnetizing inductance Lm of the transformer 16 and the first resonant capacitor Cr1 of the resonant circuit 14. Therefore, a magnetizing current Ilm flowing through the magnetizing inductance Lm and a resonant current Icr flowing through the first resonant capacitor Cr1 gradually increase. When the second switch Q2 is turned on, energy is transferred from the first resonant capacitor Cr1 on the primary side of the transformer 16 to the secondary side of the transformer 16, and the waveform of a secondary-side current Isec is like the half-sine wave current waveform of the resonant converter.

Figure 1C:
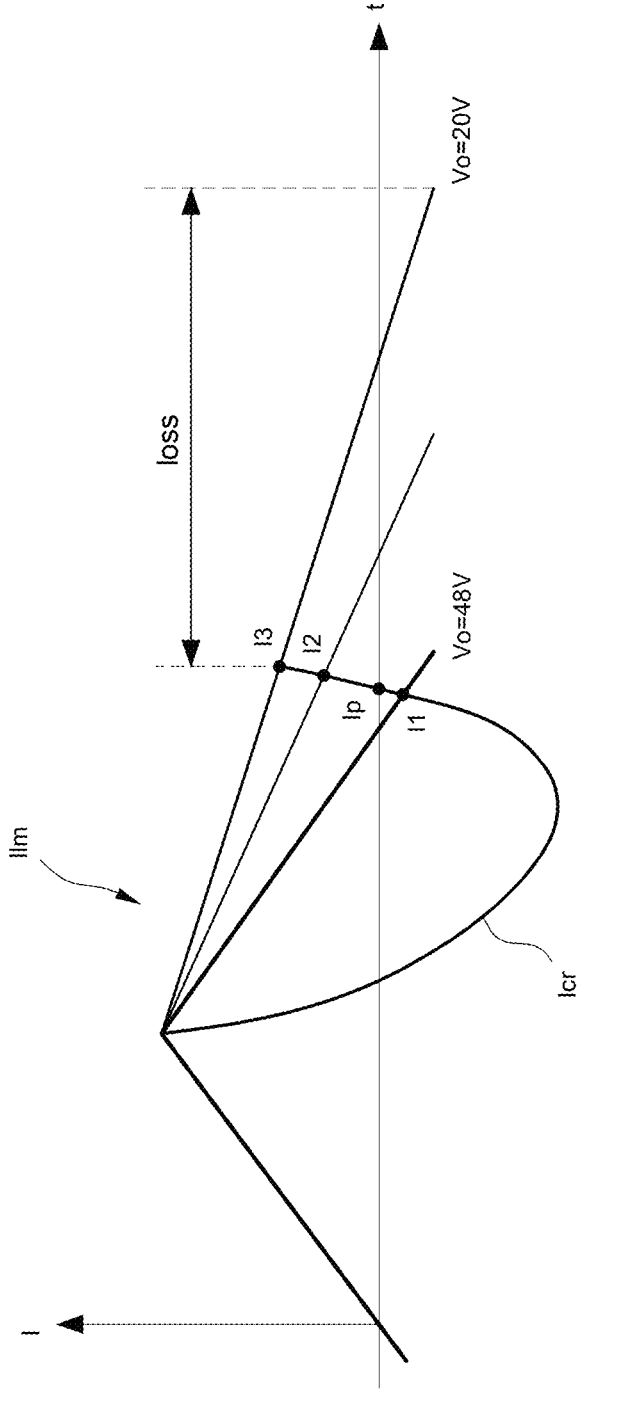
FIG. 1C is a schematic diagram of the change of a magnetizing current when an output voltage drops according to the present disclosure.

Please refer to FIG. 1C, which shows a schematic diagram of the change of a magnetizing current when an output voltage drops according to the present disclosure, and also refer to FIG. 1A and FIG. 1B. Due to the characteristics of the wide output voltage Vo (for example, but not limited to, 48V to 12V) of the power converter 100, the turned-on time of the second switch Q2 will be affected. The main reason is that the magnetizing inductance Lm will be clamped at n Vo for flux leakage (where n is a fixed parameter), and its formula is shown in the following equation 1.

$$L(di/dt) = V \qquad \text{(equation 1)}$$

The above equation 1 can be rewritten as the following equation 2:

$$dt = Ldi/nVo \qquad \text{(equation 2)}$$

It can be realized from the above equation 1 and equation 2 and referring to FIG. 1B and FIG. 1C, when the output voltage Vo is lower, the magnetic leakage time T will be greatly increased. However, as the magnetic leakage time T increases, the first resonant capacitor Cr1 (fixed capacitance value) will be discharged early. Therefore, when the output voltage Vo is lower, the current values (Iv1, Iv2, Iv3) when the resonant current Icr flowing through the first resonant capacitor Cr1 and the magnetizing current Ilm flowing through the magnetizing inductance Lm intersect will become higher and higher. Therefore, the primary-side current will have to charge the first resonant capacitor Cr1 and then be transmitted to the secondary side, thereby causing the energy transmission efficiency to be greatly reduced, and further leading to a decrease in efficiency.

Therefore, the main purpose and effect of the present disclosure is that when the output voltage Vo of the power converter 100 is too low, the controller 3 controls the resonant adjustment circuit 4 to adjust the resonant current Icr flowing through the first resonant capacitor Cr1 according to the output voltage Vo so as to adjust a current value (Iv1, Iv2, Iv3) when the resonant current Icr and the magnetizing current Ilm intersect to be substantially equal to a predetermined value Ip. Therefore, it is to achieve the effect of increasing energy transmission efficiency under the full output voltage range. In particular, the predetermined value Ip may can be 0 to avoid the situation where the primary-side current needs to charge the first resonant capacitor Cr1 and then be transmitted to the secondary side. In particular, if the output voltage Vo is too low, it can generally be regarded that the power converter 100 operates in a discontinuous resonant mode, and in this mode, the second switch Q2 generally has a longer turned-on time (compared to the first switch Q1). However, the main basis for whether the controller 3 controls the resonant adjustment circuit 4 is mainly based on whether the first resonant capacitor Cr1 will be discharged early. Therefore, whether the output voltage Vo of the power converter 100 is too low depends mainly on whether the current values (Iv1, Iv2, Iv3) when the resonant current Icr and the magnetizing current Ilm intersect deviate from the predetermined value Ip, and it may be determined by whether the power converter 100 operates in the discontinuous resonant mode. In particular, the "substantially" refers to a specific range of positive and negative values that may be 0 (for example, but not limited to plus or minus 5%), but it is not limited to this, and it may be adjusted according to the actual needs.

Figure 2:
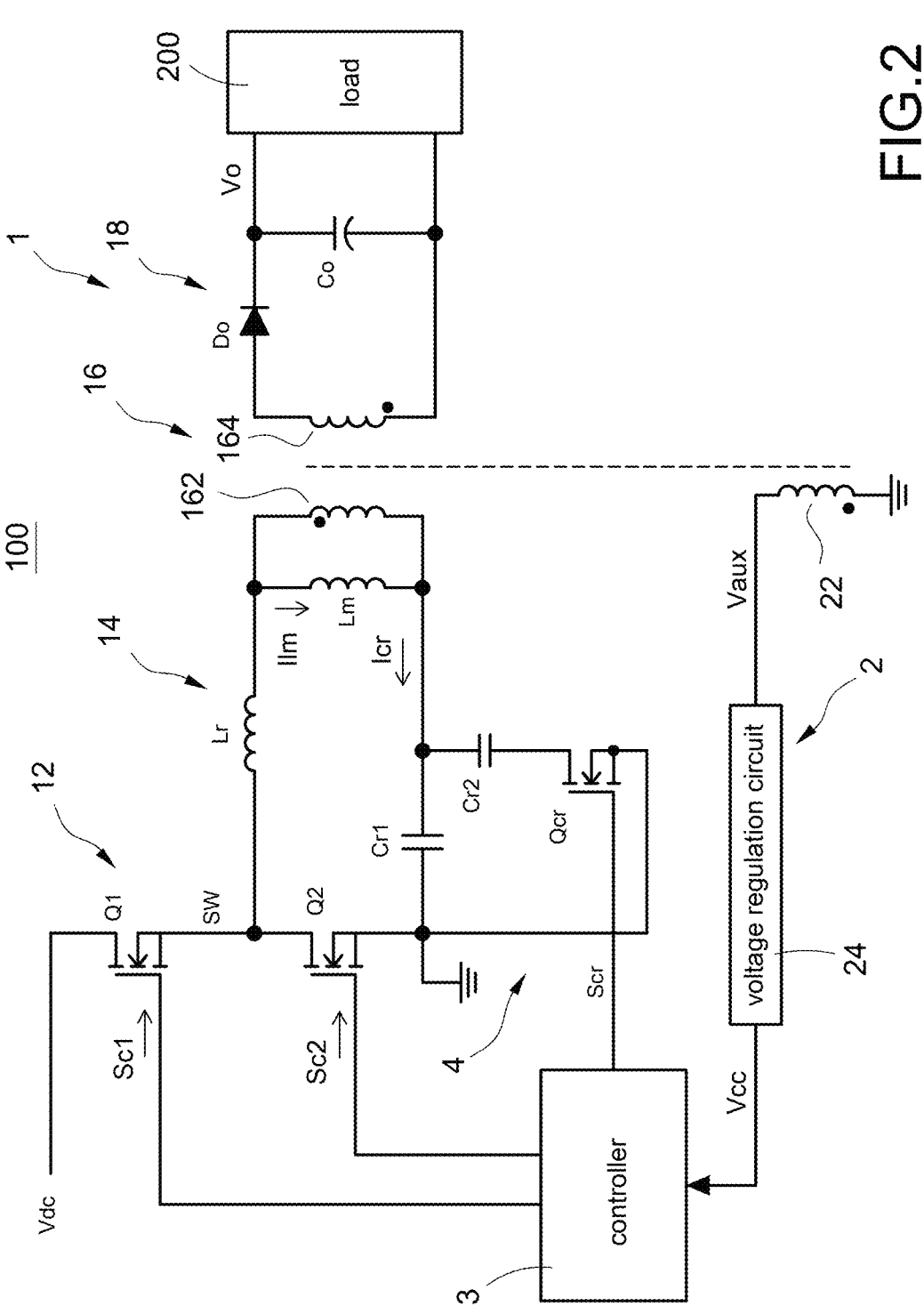
FIG. 2 is a detailed block circuit diagram of the asymmetric half-bridge flyback power converter according to the present disclosure.

Please refer to FIG. 2, which shows a detailed block circuit diagram of the asymmetric half-bridge flyback power converter according to the present disclosure, and also refer to FIG. 1A to FIG. 1C. In FIG. 2, a more detailed circuit structure of the power converter 100 is shown, mainly the internal structure of the resonant adjustment circuit 4. Specifically, the resonant adjustment circuit 4 further includes a second resonant capacitor Cr2 and a switch Qcr. One terminal of the second resonant capacitor Cr2 is coupled to one terminal of the first resonant capacitor Cr1, and the other terminal of the second resonant capacitor Cr2 is coupled to one terminal of the switch Qcr. The other terminal of the switch Qcr is coupled to the other terminal of the first resonant capacitor Cr1, and the controller 3 is coupled to a control terminal of the switch Qcr. Moreover, when the controller 3 realizes that the output voltage Vo of the power converter 100 is too low, the controller 3 provides a switch control signal Scr to the switch Qcr according to the magnitude of the output voltage Vo to control the switch Qcr to be turned on for a specific time. Therefore, the controller 3 can adjust the current values (Iv1, Iv2, Iv3) when the resonant current Icr and the magnetizing current Ilm intersect to be substantially equal to the predetermined value Ip by controlling the timing of turning on and turning off the switch Qcr.

Moreover, since the controller 3 needs to adjust the energy/power stored in the second resonant capacitor Cr2 according to the amount of energy/power stored in the first resonant capacitor Cr1 to adjust the intersection position of the current values (Iv1, Iv2, Iv3), when the controller 3 realizes that the output voltage Vo of the power converter 100 is too low and the first switch Q1 is turned on, the controller 3 needs to control the switch Qcr to be turned on for the first specific time. Also, the controller 3 adjusts the first specific time according to the magnitude of the output voltage Vo to adjust a time of charging the second resonant capacitor by the magnetizing current Ilm so as to adjust the energy/power stored in the second resonant capacitor Cr2. Afterward, after the first switch Q1 is turned off and the second switch Q2 is turned on, the controller 3 controls the switch Qcr to be turned on for a second specific time so that the second resonant capacitor Cr2 participates to discharge. Due to the participation of the second resonant capacitor Cr2 in the discharge, the resonant capacitor (that is, the first resonant capacitor Cr1 and the second resonant capacitor Cr2 connected in parallel) will not be discharged early so as to prevent the intersection of the resonant current Icr and the magnetizing current Ilm from deviating from the predetermined value Ip and interrupting the energy transfer from the primary side to the secondary side, thereby increasing the efficiency of the power converter 100.

Specifically, when the controller 3 controls the switch Qcr to be turned off, a capacitance value of the equivalent capacitance of the resonant circuit 14 is the capacitance value of the first resonant capacitor Cr1. When the controller 3 controls the switch Qcr to be turned on, the capacitance value of the equivalent capacitance of the resonant circuit 14 is a capacitance value of the first resonant capacitor Cr1 and the second resonant capacitor Cr2 connected in parallel.

When the output voltage Vo is higher, the power converter 100 uses the capacitance value of the first resonant capacitor Cr1 to resonate, thereby meeting the requirement of high efficiency. Therefore, the controller 3 controls the switch Qcr to be turned off to provide a smaller capacitance value for resonance. On the contrary, when the output voltage Vo of the power converter 100 is too low, if the power converter 100 only uses the capacitance value of the first resonant capacitor Cr1 for resonance, it cannot meet the requirement of high efficiency. Therefore, the controller 3 controls the switch Qcr to be turned on at a specific time to provide a larger capacitance value for resonance. In one embodiment, the "specific time" may be formed by a first specific time and a second specific time, and the first specific time and the second specific time may be separated into two time periods, or they may be integrated into one time period. There will be a further description later.

Figure 3A:
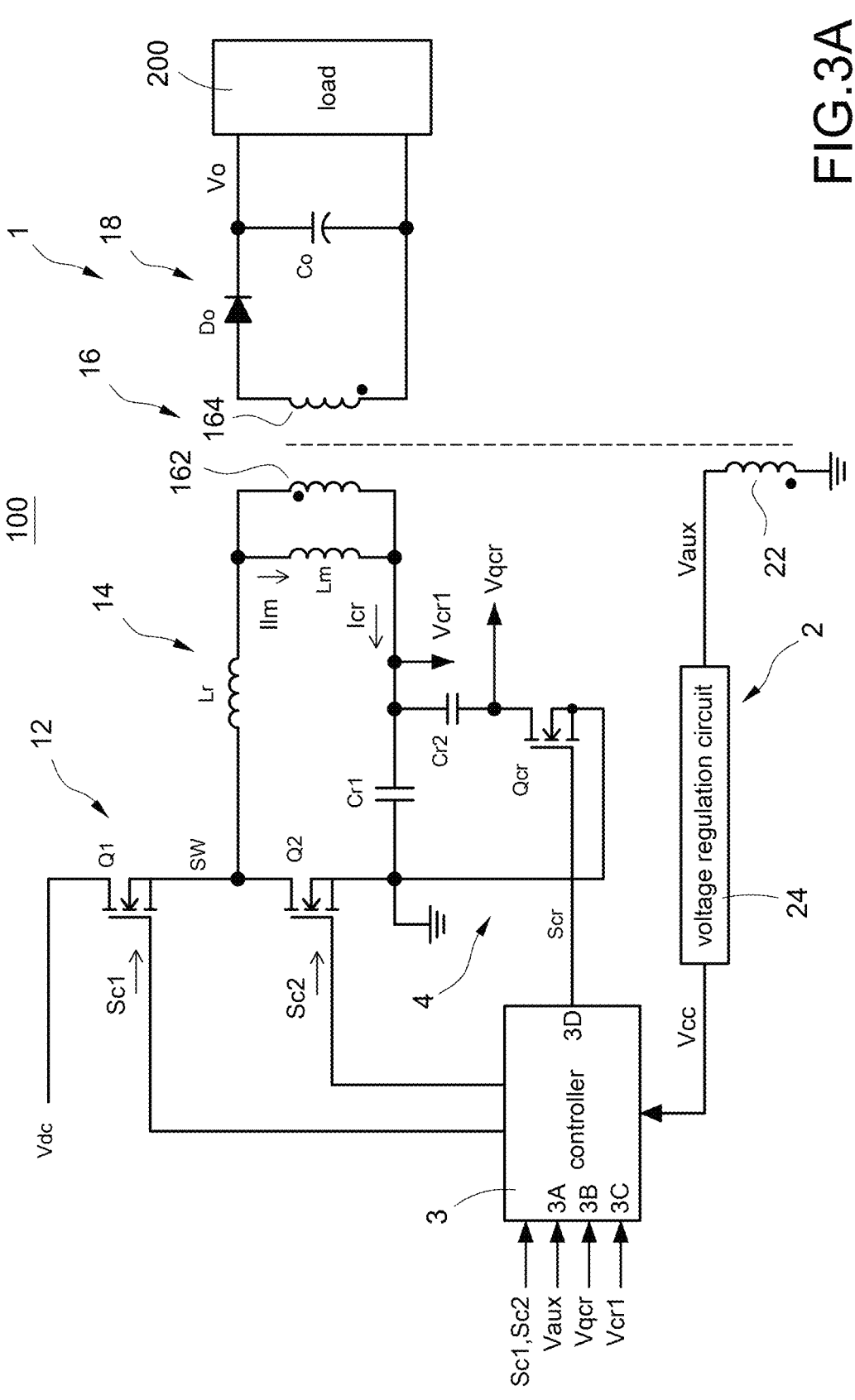
FIG. 3A is a detailed block circuit diagram of the asymmetric half-bridge flyback power converter using a controller according to a first embodiment of the present disclosure.

Please refer to FIG. 3A, which shows a detailed block circuit diagram of the asymmetric half-bridge flyback power converter, and also refer to FIG. 1A to FIG. 2. In FIG. 3A, the controller 3 provides the first control signal Sc1 and the second control signal Sc2 respectively to control the first switch Q1 and the second switch Q2 to be turned on and turned off, and the auxiliary winding 22 is coupled to the primary-side winding 162 to generate the auxiliary voltage Vaux. In particular, the controller 3 may realize the energy difference between the capacitor voltage Vcr1 and the auxiliary voltage Vaux (corresponding to the output voltage Vo) after the first resonant capacitor Cr1 is discharged according to the auxiliary voltage Vaux and the capacitor voltage Vcr1 of the first resonant capacitor Cr1 so as to set a specific duty cycle to control the charging of the second resonant capacitor Cr2 to compensate for the energy difference accordingly. Therefore, the controller 3 can control the switch Qcr to be turned on for the first specific time according to the specific duty cycle to charge the second resonant capacitor Cr2.

In one embodiment, the controller 3 includes a first detection terminal 3A, a second detection terminal 3B, a third detection terminal 3C, and a control terminal 3D. The first detection terminal 3A may receive a voltage signal corresponding to the auxiliary voltage Vaux through, for example, but not limited to, a detection circuit (not shown) so that the controller 3 can realize the auxiliary voltage Vaux and the corresponding output voltage Vo according to the voltage signal. Also, the controller 3 can receive the first control signal Sc1 and the second control signal Sc2 through external electrical wiring or internal wiring of the controller 3 to realize the turning on/turning off of the first switch Q1 and the second switch Q2. In addition, the second detection terminal 3B may receive a voltage signal corresponding to the switch voltage Vqcr of the switch Qcr through, for example, but not limited to, a detection circuit (not shown) so that the controller 3 can realize the magnitude of the switch voltage Vqcr according to the voltage signal. Similarly, the third detection terminal 3C may receive a voltage signal corresponding to the capacitor voltage Vcr1 of the first resonant capacitor Cr1 through, for example, but not limited to, a detection circuit (not shown) so that the controller 3 can realize the magnitude of the capacitor voltage Vcr1 of the voltage signal. Therefore, the control terminal 3D of the controller 3 can provide the switch control signal Scr to control the switch Qcr to be turned on for a specific time according to the first control signal Sc1, the second control signal Sc2, the auxiliary voltage Vaux, the capacitor voltage Vcr1, and the switch voltage Vqcr. Therefore, the current value when the resonant current Icr and the magnetizing current Ilm intersect can be adjusted to be substantially equal to the predetermined value Ip by adjusting the resonant current Icr.

Figure 3B:
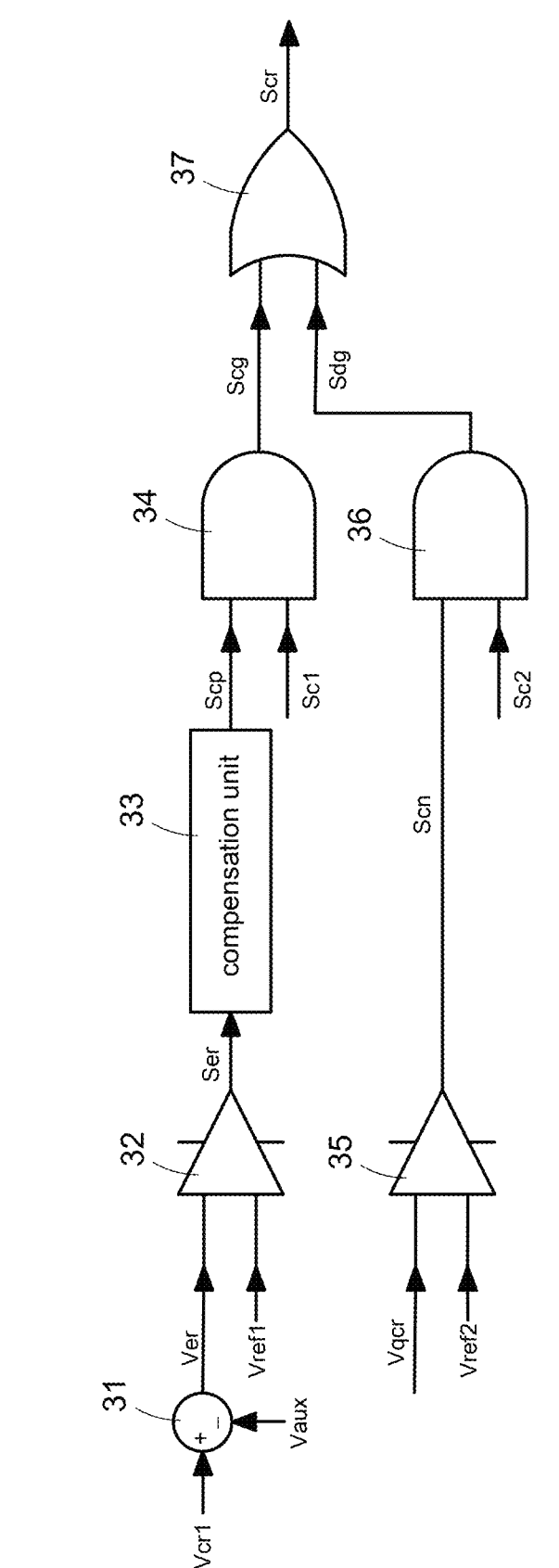
FIG. 3B is a detailed block circuit diagram of the controller according to the first embodiment of the present disclosure.

Please refer to FIG. 3B, which shows a detailed block circuit diagram of the controller according to the first embodiment of the present disclosure, and also refer to FIG. 1A to FIG. 3A. In FIG. 3B, the controller 3 includes a computing unit 31, a first comparison unit 32, a compensation unit 33, a first AND operation unit 34, a second comparison unit 35, and a second AND operation unit 36. In particular, the computing unit 31, the first comparison unit 32, the compensation unit 33, and the first AND operation unit 34 form a first logic circuit to adjust the first specific time, and the second comparison unit 35 and the second AND operation unit 36 form a second logic circuit to adjust the second specific time.

Moreover, in the first logic circuit, the computing unit 31 may be a device with a function of taking out the difference between a target value and an actual value, and this device, may be, for example, but not limited to, a device such as a subtractor, but not limited to this. All circuits that can achieve the above effects should be included in the scope of this embodiment. The computing unit 31 provides the voltage error value Ver according to the auxiliary voltage Vaux and the capacitor voltage Vcr1 to acquire the error between the target value and the actual value. Afterward, the first comparison unit 32 compares the voltage error value Ver with a first reference voltage Vref1 to generate an error signal Ser, and the compensation unit 33 compensates the error signal Ser to calculate a specific duty cycle of turning on the switch Qcr and generate a voltage compensation signal Scp. In particular, the first comparison unit 32 may be, for example, but not limited to, a comparator or other devices with a comparison function, and the compensation unit 33 may be, for example, but not limited to, a one-stage or multi-stage compensation circuit, but is not limited thereto. All circuits that can achieve the above effects should be included in the scope of this embodiment. Finally, the first AND operation unit 34 (for example, but not limited to, it may be an AND gate, or a circuit composed of circuits with an AND operation function), performs an and operation (intersection operation) on the voltage compensation signal Scp and the first control signal Sc1 to generate a charging control signal Scg. Therefore, the charging control signal Scg represents the length of time required for the switch Qcr to be turned on when the first switch Q1 is turned on (i.e., the first specific time). Therefore, when the first switch Q1 is turned on, the controller 3 can control the switch Qcr to be turned on or turned off according to the charging control signal Scg, and when the switch Qcr is turned on, the second resonant capacitor Cr2 starts to charge.

On the other hand, in the second logic circuit, the second comparison unit 35 compares the switch voltage Vqcr with a second reference voltage Vref2 to generate a voltage comparison signal Scn. Specifically, when the second switch Q2 starts to turn on, the first resonant capacitor Cr1 starts to discharge. When the first resonant capacitor Cr1 is discharged to be lower than the second resonant capacitor Cr2, a junction diode of the switch Qcr is forward biased and turned on at this time. Therefore, the second comparison unit 35 mainly determines whether the junction diode of the switch Qcr is forward biased and turned on through comparison. Afterward, the second AND operation unit 36 performs an and operation (intersection operation) on the voltage comparison signal Son and the second control signal Sc2 to generate a discharging control signal Sdg. In particular, the second comparison unit 35 may be, for example, but not limited to, a comparator or other devices with a comparison function, and the second AND operation unit 36 may be, for example but not limited to, an AND gate, or a circuit composed of circuits with an AND operation function, but is not limited to this. All circuits that can achieve the above effects should be included in the scope of this embodiment. Therefore, the discharging control signal Sdg represents the length of time required for the switch Qcr to be turned on when the second switch Q2 is turned on (i.e., the second specific time). Therefore, after the second switch Q2 is turned on, the controller 3 can control the switch Qcr to be turned on or turned off according to the discharging control signal Sdg, and when the switch Qcr is turned on, the second resonant capacitor Cr2 starts to discharge. In other words, when the junction diode of the switch Qcr is forward biased and turned on, the second resonant capacitor Cr2 starts to participate to discharge so that the resonant capacitor (that is, the first resonant capacitor Cr1 and the second resonant capacitor Cr2 connected in parallel) will not be discharged early.

As shown in FIG. 3B, the controller 3 may optionally include an OR operation unit 37 (may be, for example, but not limited to, an OR gate, or a circuit composed of circuits with an OR operation function). The OR operation unit 37 receives the charging control signal Scg and the discharging control signal Sdg, and provides the switch control signal Scr according to the charging control signal Scg and the discharging control signal Sdg to control the switch Qcr to be turned on and turned off. Since the charging control signal Scg and the discharging control signal Sdg are independent control signals, that is, when the first switch Q1 is turned on, the control signal is the charging control signal Scg, and when the second switch Q2 is turned on, the control signal is the discharging control signal Sdg. Therefore, if the controller 3 does not include the OR operation unit 37, the switch Qcr may also be directly controlled by the charging control signal Scg and the discharging control signal Sdg.

In one embodiment, the internal circuit of the controller 3 shown in FIG. 3B is only a logic circuit used to perform resonance compensation operation on the power converter 100, and the remaining logic circuits not shown (such as, but not limited to controlling the first switch Q1 and the second switch Q2) are not the main features of the present disclosure and will not be described in detail here. In another embodiment, the above method of performing the resonance compensation operation is not limited to being implemented only by the logic circuit shown in FIG. 3B. All logic circuits that can achieve the above resonance compensation operation, or electronic circuits composed of electronic components, programmed software control and other implementation methods should be included in the scope of this embodiment.

Figure 3C:
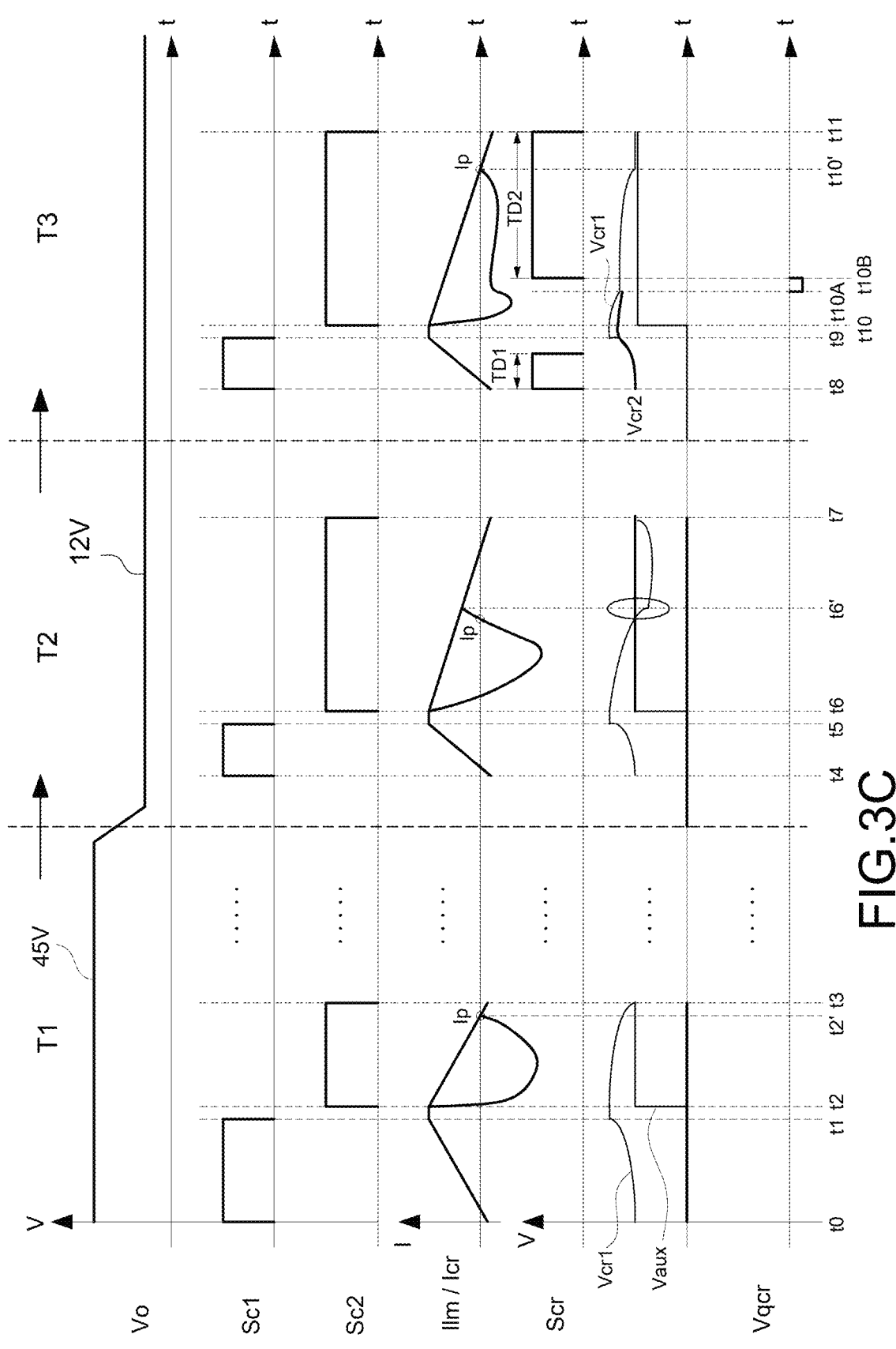
FIG. 3C is a timing waveform diagram of operating the controller according to the first embodiment of the present disclosure.

Please refer to FIG. 3C, which shows a timing waveform diagram of operating the controller according to the first embodiment of the present disclosure, and also refer to FIG. 1A to FIG. 3B. During a time period T1, the controller 3 determines that the output voltage Vo is higher than a voltage threshold (such as but not limited to 45V), and therefore the controller 3 controls the power converter 100 to operate in a continuous resonant mode. Furthermore, during time t0 to time t1, the controller 3 controls the first switch Q1 to be turned on. In this condition, the DC voltage Vdc charges the magnetizing inductance Lm and the first resonant capacitor Cr1, and therefore the resonant current Icr and the magnetizing current Ilm rise synchronously. Time t1 to time t2 is a dead time after the first switch Q1 is turned off and before the second switch Q2 is turned on. The magnetizing current Ilm discharges the parasitic capacitance of the second switch Q2, and after the junction diode of the second switch Q2 is forward biased and turned on, the controller 3 controls the second switch Q2 to be turned on (i.e., time t2).

During time t2 to time t3, the controller 3 controls the second switch Q2 to be turned on. In this condition, the resonant circuit 14 starts to perform a resonant operation, thereby causing the magnetizing inductance Lm and the first resonant capacitor Cr1 to start discharging. At time t2', the current value when the resonant current Icr and the magnetizing current Ilm intersect is substantially equal to the predetermined value Ip. Since the controller 3 determines that the first resonant capacitor Cr1 has not been discharged early due to the decrease in the output voltage Vo at time t2' according to the auxiliary voltage Vaux and the capacitor voltage Vcr1, the controller 3 determines that there is no need to activate the resonance compensation operation as shown in FIG. 3B and keeps the switch Qcr turned off. Therefore, the capacitance value of the equivalent capacitance of the resonant circuit 14 is the capacitance value of the first resonant capacitor Cr1, and the power converter 100 can operate with high efficiency.

In the time period T2, the controller 3 detects for the first time that the output voltage Vo is lower than a voltage threshold (such as but not limited to 12V), and therefore the controller 3 needs to control the power converter 100 to perform a mode conversion (i.e., the continuous resonant mode is converted into a discontinuous resonant mode). Furthermore, during time t4 to time t5, since the output voltage Vo decreases, the controller 3 controls the duty cycle of turning on the first switch Q1 to decrease. Moreover, the timing waveform diagram during time t4 to time t6 is substantially the same as that during time t1 to time t3, and will not be described again here.

During time t6 to time t7, the controller 3 controls the second switch Q2 to be turned on, and since the output voltage Vo decreases, the controller 3 controls the duty cycle of turning on the second switch Q2 to increase. In this condition, the resonant circuit 14 starts to perform a resonant operation, thereby causing the magnetizing inductance Lm and the first resonant capacitor Cr1 to start discharging. However, during this time period, since the resonance compensation operation of the second resonant capacitor Cr2 is not activated, at time t6', the current value when the resonant current Icr and the magnetizing current Ilm intersect deviates from the predetermined value Ip. Also, it can be clearly seen from time t6' that the first resonant capacitor Cr1 is discharged early due to the prolonged magnetic leakage time of the magnetizing inductance Lm, and therefore the energy transmission efficiency will be greatly reduced, which will lead to a decrease in efficiency. On the other hand, since the controller 3 determines that the first resonant capacitor Cr1 has been discharged early due to the decrease in the output voltage Vo according to the auxiliary voltage Vaux and the capacitor voltage Vcr1 at time t6', the controller 3 determines that it is necessary to activate the resonance compensation operation as shown in FIG. 3B (i.e., the second resonant capacitor Cr2 is incorporated). Moreover, the controller 3 temporarily keeps the switch Qcr turned off during the transient period of this transition (i.e., the time period T2).

In the time period T3, the controller 3 has detected that the output voltage Vo is lower than the voltage threshold in the previous time period (i.e., time period T2), and the power converter 100 operates in the discontinuous resonant mode. In this mode, the resonance compensation operation of FIG.

3B has been activated, and during time t8 to time t9, the controller 3 controls the first switch Q1 to be turned on so that the DC voltage Vdc charges the magnetizing inductance Lm and the first resonant capacitor Cr1, thereby synchronously rising the resonant current Icr and the magnetizing current Ilm. In this condition, the first comparison unit 32 compares the voltage error value Ver with the first reference voltage Vref1 to generate the error signal Ser, and the compensation unit 33 compensates the error signal Ser to calculate the specific duty cycle of turning on the switch Qcr. The controller 3 then performs an intersection operation on the voltage compensation signal Scp and the first control signal Sc1 through the first AND operation unit 34 so that the switch Qcr and the first switch Q1 are turned on for the first specific time TD1 within the same time interval. Therefore, the controller 3 can calculate the specific duty cycle according to the auxiliary voltage Vaux and the capacitor voltage Vcr1, and adjust the switch control signal Scr according to the specific duty cycle to control the switch Qcr to be turned on for the first specific time. In particular, the first specific time TD1 during the switch Qcr being turned on is not necessarily the same width as the first switch Q1. Moreover, when the switch Qcr is turned on (time t8), the second resonant capacitor Cr2 starts to charge, thereby causing a capacitor voltage Vcr2 of the second resonant capacitor Cr2 to increase. In particular, the specific duty cycle may be a ratio when switch Qcr is turned on compared to when the first switch Q1 is turned on, but is not limited to this, it may also be converted into a ratio when switch Qcr is turned on compared to the entire switching period (i.e., time period T3).

During the dead time from time t9 to time t10, the magnetizing current Ilm discharges the parasitic capacitance of the second switch Q2, and the capacitor voltage Vcr1 of the first resonant capacitor Cr1 and the capacitor voltage Vcr2 of the second resonant capacitor Cr2 have not yet been discharged and are maintained at approximately is equal to the fixed value. During time t10 to time t11, the controller 3 controls the second switch Q2 to be turned on. In this condition, the resonant circuit 14 starts to perform a resonant operation, thereby causing the magnetizing inductance Lm and the first resonant capacitor Cr1 to start discharging. Before time t10A, the first resonant capacitor Cr1 is discharged until its electric power is equivalent to that of the second resonant capacitor Cr2, but is not yet lower than that of the second resonant capacitor Cr2. In this condition, the resonant current Icr gradually returns to the predetermined value Ip, but the magnetizing current Ilm decreases slowly, and the current value at the intersection will deviate from the predetermined value Ip. During time t10A to time t10B, the first resonant capacitor Cr1 is discharged to be lower than the second resonant capacitor Cr2. In this condition, the junction diode of switch Qcr is forward biased and turned on (the voltage when it is forward biased and turned on may be, for example, but not limited to, 0.5V to 0.7V). Therefore, the second comparison unit 35 generates the voltage comparison signal Scn corresponding to this situation. Moreover, since the second switch Q2 is still turned on, the intersection operation of the second AND operation unit 36 on the voltage comparison signal Son and the second control signal Sc2 causes the controller 3 controlling the switch Qcr to be turned on for the second specific time TD2. Due to the participation of the second resonant capacitor Cr2 in the discharge, the capacitance value of the equivalent capacitance of the resonant circuit 14 is the capacitance value of the first resonant capacitor Cr1 in parallel with the second resonant capacitor Cr2 will not be discharged early. Therefore, the controller 3 can adjust the switch control signal Scr according to the switch voltage Vqcr to control the switch Qcr to be turned on for the second specific time TD2. Accordingly, the current value when the resonant current Icr and the magnetizing current Ilm intersect (i.e., time t10') is substantially equal to the predetermined value Ip, and the power converter 100 can operate with high efficiency.

Figure 4A:
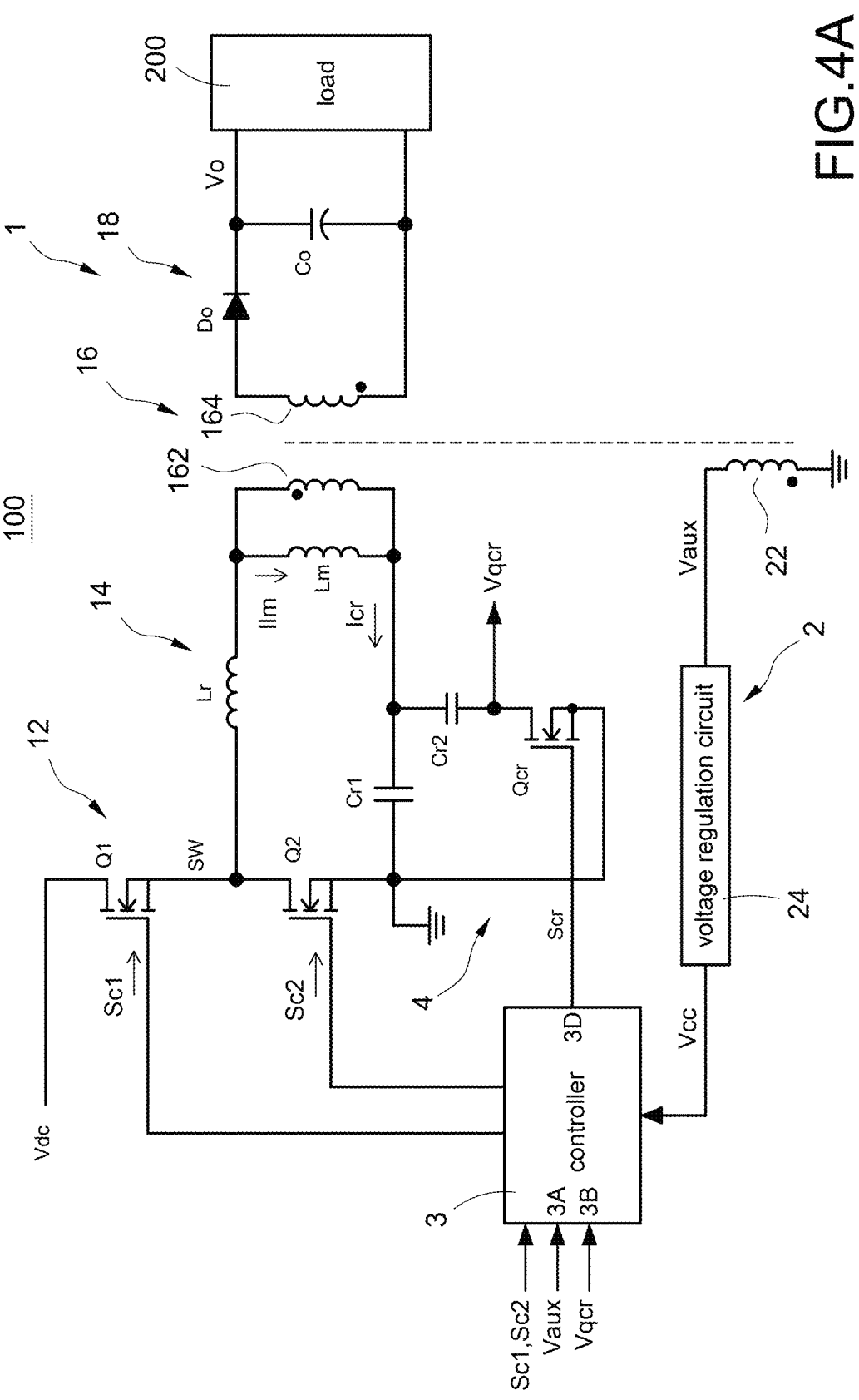
FIG. 4A is a detailed block circuit diagram of the asymmetric half-bridge flyback power converter using the controller according to a second embodiment of the present disclosure.
Figure 4B:
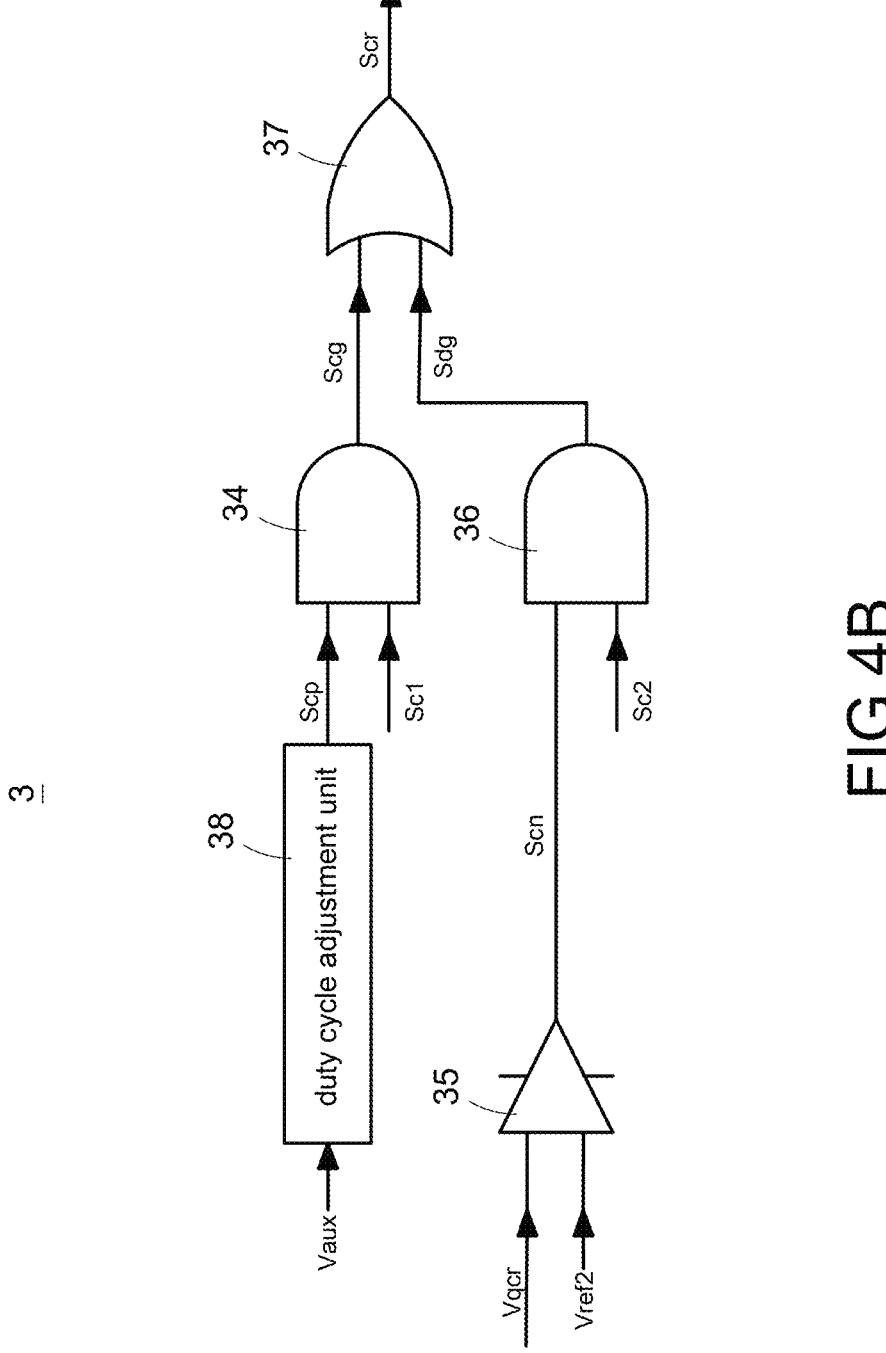
FIG. 4B is a detailed block circuit diagram of the controller according to the second embodiment of the present disclosure.
Figure 4C:
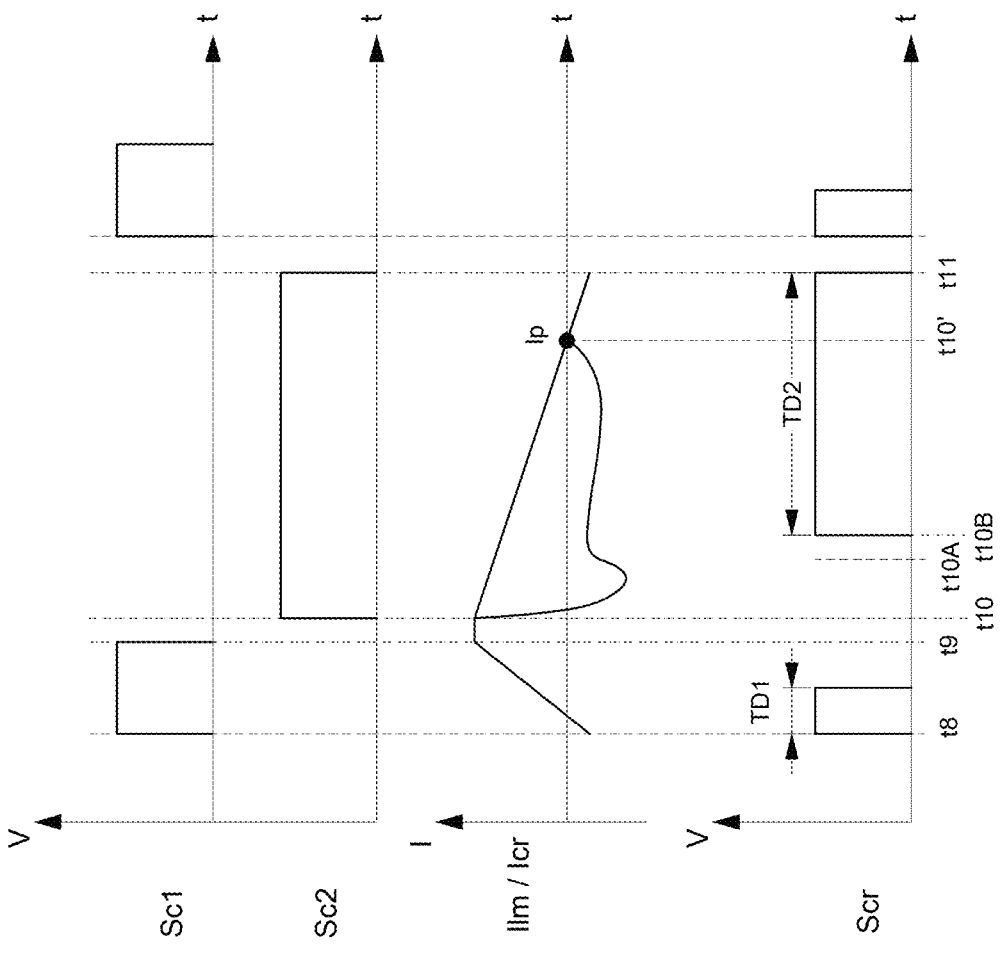
FIG. 4C is a timing waveform diagram of operating the controller according to the second embodiment of the present disclosure.

Please refer to FIG. 4A, which shows a detailed block circuit diagram of the asymmetric half-bridge flyback power converter using the controller according to a second embodiment of the present disclosure; please refer to FIG. 4B, which shows a detailed block circuit diagram of the controller according to the second embodiment of the present disclosure; please refer to FIG. 4C, which shows a timing waveform diagram of operating the controller according to the second embodiment of the present disclosure, and also refer to FIG. 1A to FIG. 3C. The difference between FIG. 4A to FIG. 4C and FIG. 3A to FIG. 3C is that the controller 3 can provide the switch control signal Scr to control the switch Qcr to be turned on for a specific time according to the first control signal Sc1, the second control signal Sc2, the auxiliary voltage Vaux, and the switch voltage Vqcr.

Specifically, as shown in FIG. 4B and FIG. 4C, the computing unit 31, the first comparison unit 32, and the compensation unit 33 of the first logic circuit are replaced by a duty cycle adjustment unit 38. The duty cycle adjustment unit 38 calculates a specific duty cycle of turning on the switch Qcr according to the auxiliary voltage Vaux, and generates the voltage compensation signal Scp. That is, the duty cycle adjustment unit 38 provides a corresponding specific duty cycle (for example, but not limited to, 12V corresponds to 50%, 15V corresponds to 60%, etc.) according to the magnitude of the auxiliary voltage Vaux (corresponding output voltage Vo), and turns on the switch Qct to be turned on for the first specific time TD1 according to the specific duty cycle. In particular, since the difference between FIG. 4C and FIG. 3C is only the time period T3, only the waveform of the time period T3 is shown here. In particular, the descriptions of components, coupling relationships, and operation methods not illustrated in FIG. 4A to FIG. 4C are similar to those in FIG. 3A to FIG. 3C, and even the logic circuit is not limited to FIG. 4C and will not be described again here.

Figure 5A:
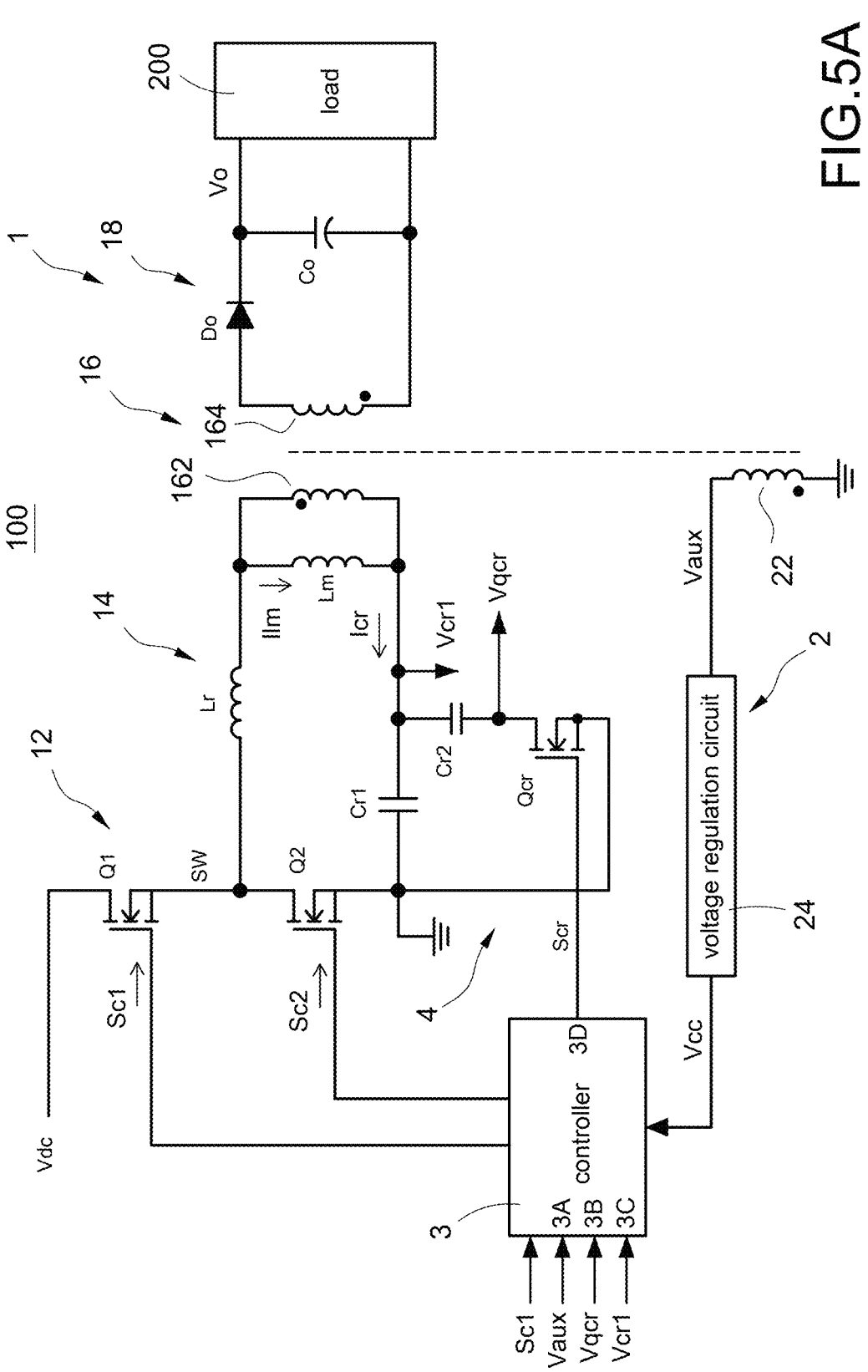
FIG. 5A is a detailed block circuit diagram of the asymmetric half-bridge flyback power converter using the controller according to a third embodiment of the present disclosure.
Figure 5B:
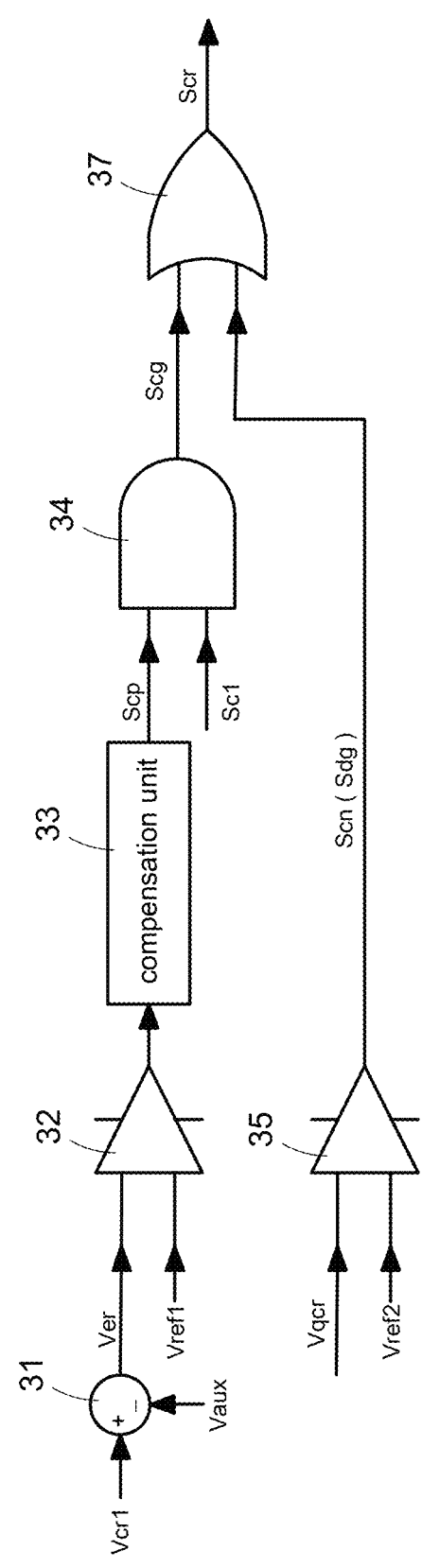
FIG. 5B is a detailed block circuit diagram of the controller according to the third embodiment of the present disclosure.
Figure 5C:
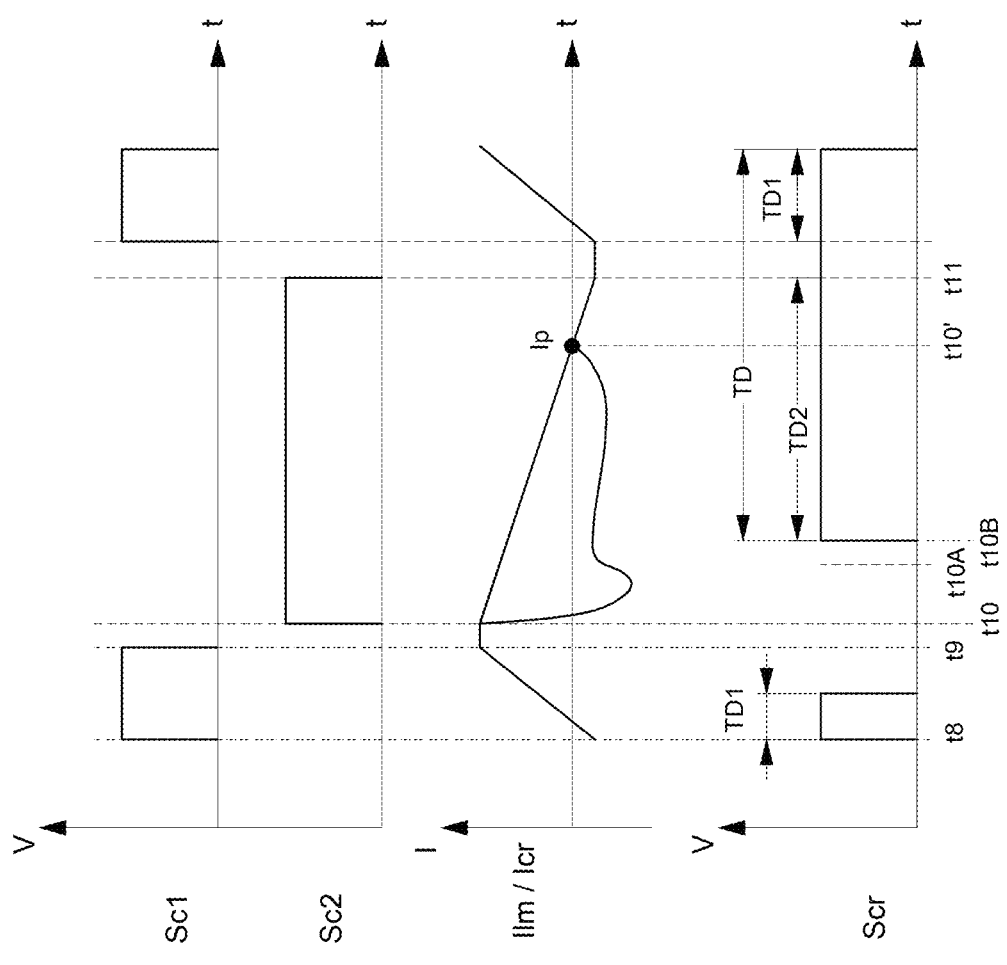
FIG. 5C is a timing waveform diagram of operating the controller according to the third embodiment of the present disclosure.

Please refer to FIG. 5A, which shows a detailed block circuit diagram of the asymmetric half-bridge flyback power converter using the controller according to a third embodiment of the present disclosure; please refer to FIG. 5B, which shows a detailed block circuit diagram of the controller according to the third embodiment of the present disclosure; please refer to FIG. 5C, which shows a timing waveform diagram of operating the controller according to the third embodiment of the present disclosure, and also refer to FIG. 1A to FIG. 4C. The difference between FIG. 5A to FIG. 5C and FIG. 3A to FIG. 3C is that the controller 3 can provide the switch control signal Scr according to the first control signal Sc1, the auxiliary voltage Vaux, the capacitor voltage Vcr1, and the switch voltage Vqcr to control the switch Qcr to be turned on for a specific time.

Specifically, as shown in FIG. 5B and FIG. 5C, the second logic circuit omits the second AND operation unit 36 so that the second comparison unit 35 compares the switch voltage Vqcr with the second reference voltage Vref2 to generate the voltage comparison signal Scn, i.e., the discharging control signal Sdg. Since the controller 3 no longer relies on the turning on of the second switch Q2 as the basis for turning on the switch Qcr, as long as the junction diode of the switch Qcr is forward biased and turned on, the controller 3 will control the switch Qcr to be continuously turned on. Therefore, the controller 3 can adjust the switch control signal Scr to control the switch Qcr to be turned on for the second specific time TD2 according to the switch voltage Vqcr. Moreover, after the switch Qcr is turned on for the second specific time TD2, the switch Qcr will continuously be turned on for the first specific time TD1 so as to for a continuous specific time TD. In particular, if there is a dead time between when the second switch Q2 is turned off and when the first switch Q1 is turned on, then the specific time TD may include the dead time. Therefore, whether to add the second control signal Sc2 to perform cooperative operations may be selective according to design requirements. Similarly, in particular, since the difference between FIG. 5C and FIG. 3C is only the time period T3, only the waveform of the time period T3 is shown here. In particular, the descriptions of components, coupling relationships, and operation methods not illustrated in FIG. 5A to FIG. 5C are similar to those in FIG. 3A to FIG. 3C, and even the logic circuit is not limited to FIG. 5C and will not be described again here.

Figure 6A:
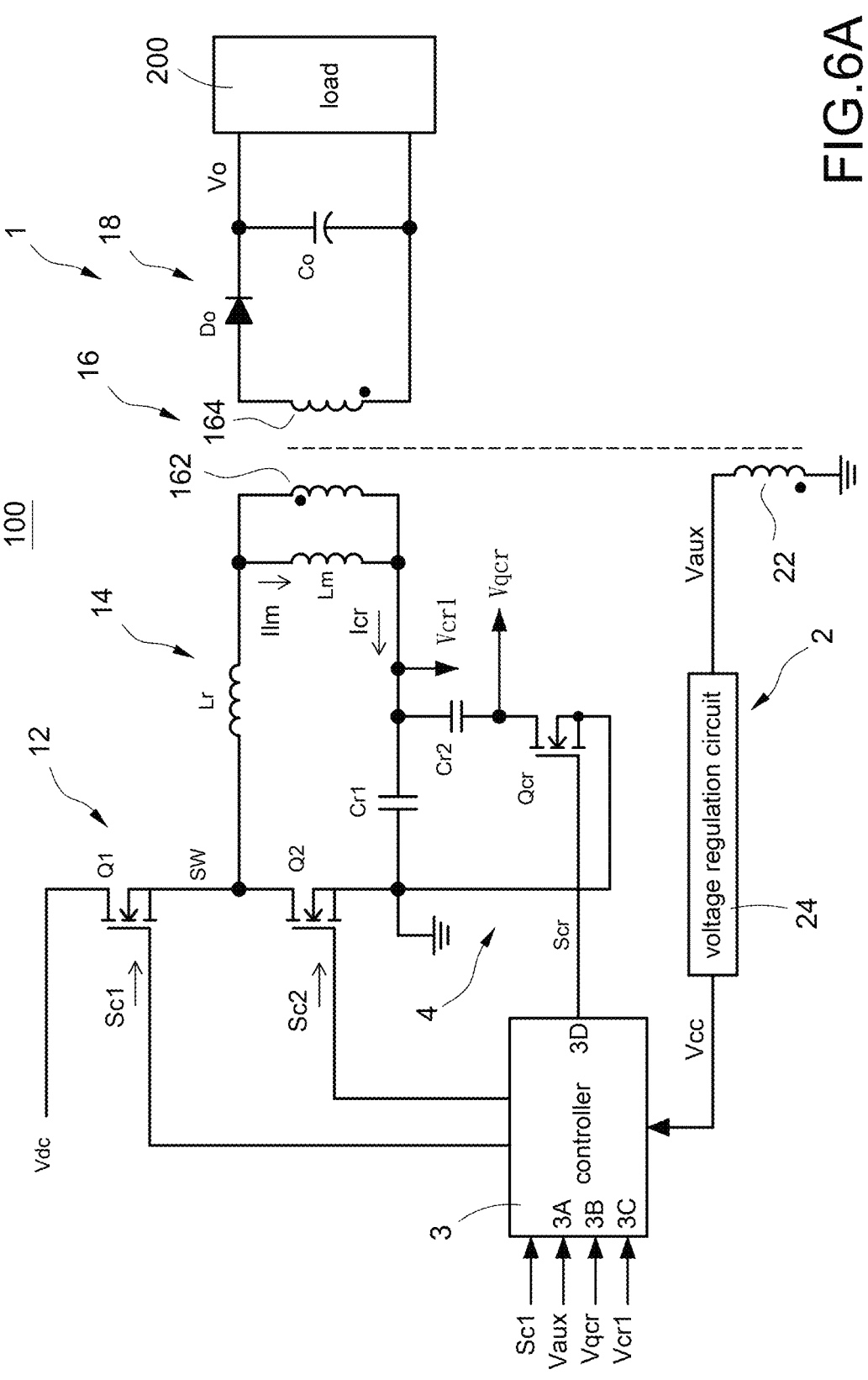
FIG. 6A is a detailed block circuit diagram of the asymmetric half-bridge flyback power converter using the controller according to a fourth embodiment of the present disclosure.
Figure 6B:
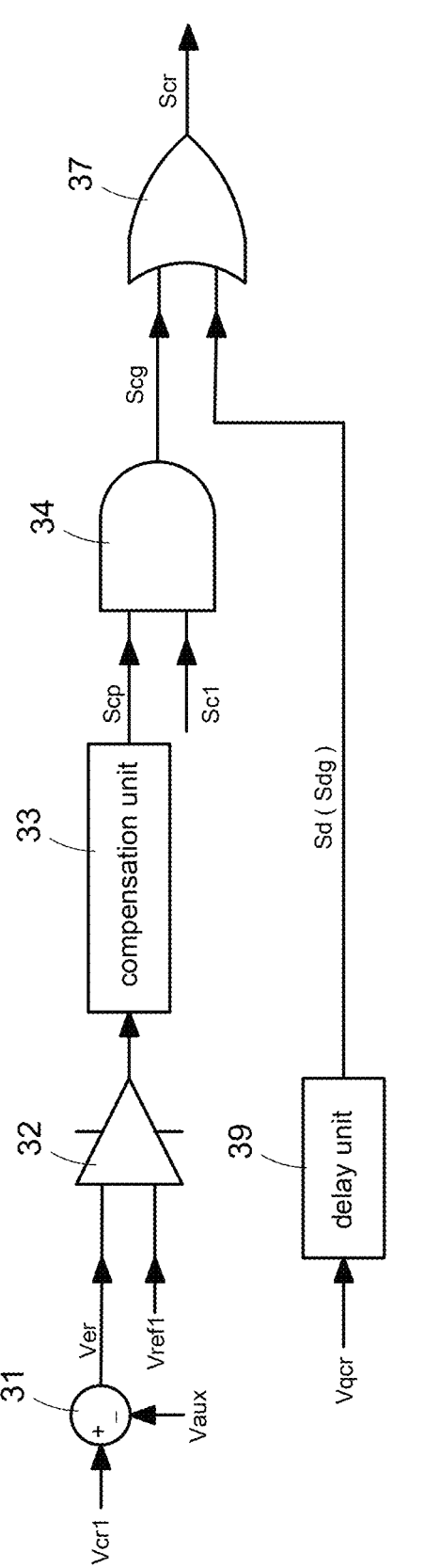
FIG. 6B is a detailed block circuit diagram of the controller according to the fourth embodiment of the present disclosure.
Figure 6C:
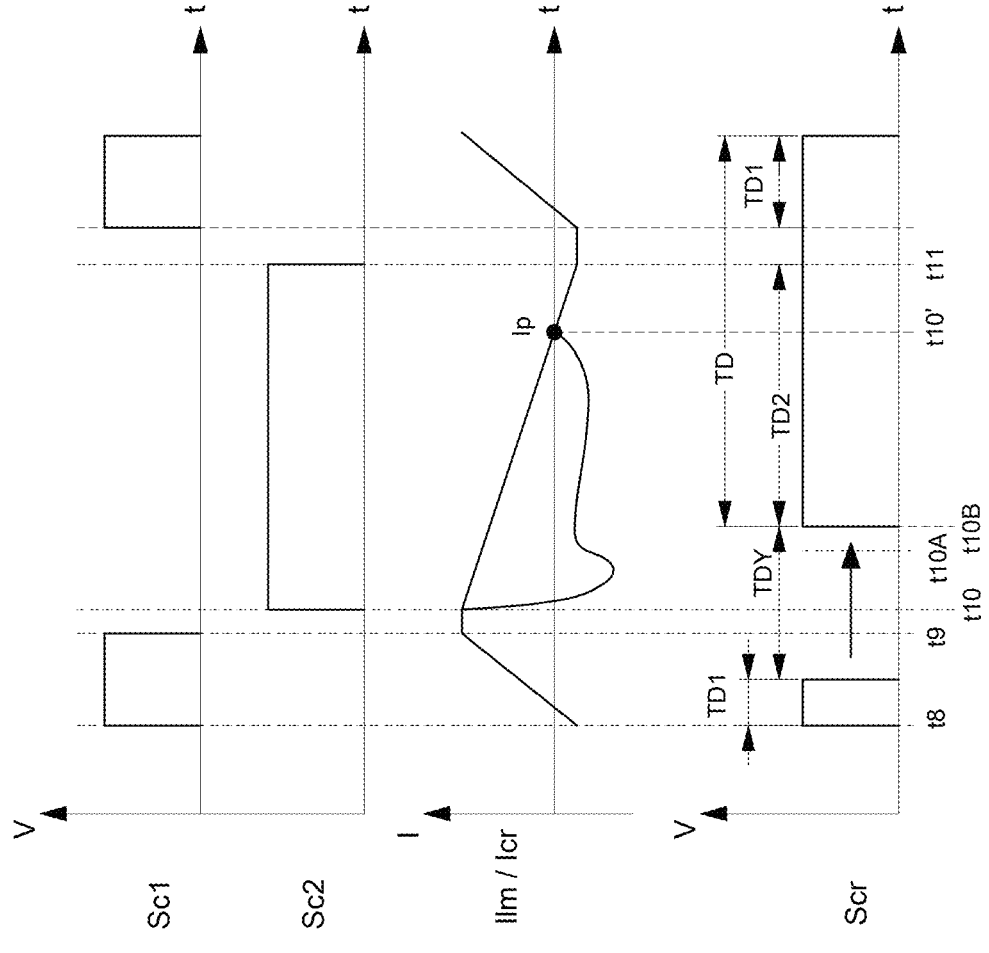
FIG. 6C is a timing waveform diagram of operating the controller according to the fourth embodiment of the present disclosure.

Please refer to FIG. 6A, which shows a detailed block circuit diagram of the asymmetric half-bridge flyback power converter using the controller according to a fourth embodiment of the present disclosure; please refer to FIG. 6B, which shows a detailed block circuit diagram of the controller according to the fourth embodiment of the present disclosure; please refer to FIG. 6C, which shows a timing waveform diagram of operating the controller according to the fourth embodiment of the present disclosure, and also refer to FIG. 1A to FIG. 5C. The difference between FIG. 6A to FIG. 6C and FIG. 3A to FIG. 3C is that the controller 3 can provide the switch control signal Scr to control the switch Qcr to be turned on for a specific time according to the first control signal Sc1, the auxiliary voltage Vaux, the capacitor voltage Vcr1, and the switch voltage Vqcr.

Specifically, as shown in FIG. 6B and FIG. 6C, the second comparison unit 35 and the second AND operation unit 36 of the second logic circuit are replaced by a delay unit 39. The delay unit 39 provides a delay signal Sd according to the switch voltage Vqcr, and the delay signal Sd is the discharging control signal Sdg. In particular, the controller 3 waits for a delay time TDY according to the delay signal Sd. When the switch Qcr is turned on for the first specific time TD1 during the turned-on period of the first switch Q1, the controller 3 waits for the delay time TDY. In particular, the controller 3 mainly confirms the end of the first specific time TD1 according to the switch voltage Vqcr when the switch Qcr is turned off, and after the delay time TDY, the controller 3 turns on the switch Qcr for the second specific time TD2. Therefore, the controller 3 can adjust the switch control signal Scr control the switch Qcr to be turned on for the second specific time TD2 according to the switch voltage Vqcr. Moreover, after the switch Qcr is turned on for the first specific time TD1, the switch Qcr will continuously be turned on for the second specific time TD2 so as to for a continuous specific time TD. Similarly, if there is a dead time between when the second switch Q2 is turned off and when the first switch Q1 is turned on, then the specific time TD may include the dead time. Therefore, the delay time TDY can be set according to actual needs.

On the other hand, in order to avoid current surges when the capacitor voltages Vcr1, Vcr2 are different at the same time, a switch slope controller (not shown) may be optionally added, and the switch slope controller may be a low-pass filter or a current controller. Therefore, the switch Qcr may be turned on slowly and the current surge when the switch Qcr is turned on can be reduced. Similarly, in particular, since the difference between FIG. 6C and FIG. 3C is only the time period T3, only the waveform of the time period T3 is shown here. In particular, the descriptions of components, coupling relationships, and operation methods not illustrated in FIG. 6A to FIG. 6C are similar to those in FIG. 3A to FIG. 3C, and even the logic circuit is not limited to FIG. 6C and will not be described again here. In addition, the controllers 3 in the embodiments of FIG. 3B, FIG. 4B, FIG. 5B, FIG. 6C respectively have different characteristics, mainly in that the first logic circuit and the second logic circuit are different. However, according to actual needs, one of the first logic circuits in FIG. 3B, FIG. 4B, FIG. 5B, FIG. 6C can be selected to match the other's second logic circuit to form a specific controller 3. The generated timing waveform diagram that this specific controller 3 can be equivalently deduced according to the characteristics detailed in FIG. 3A to FIG. 6C, which will not be described one by one based on various permutations and combinations.

Figure 7:
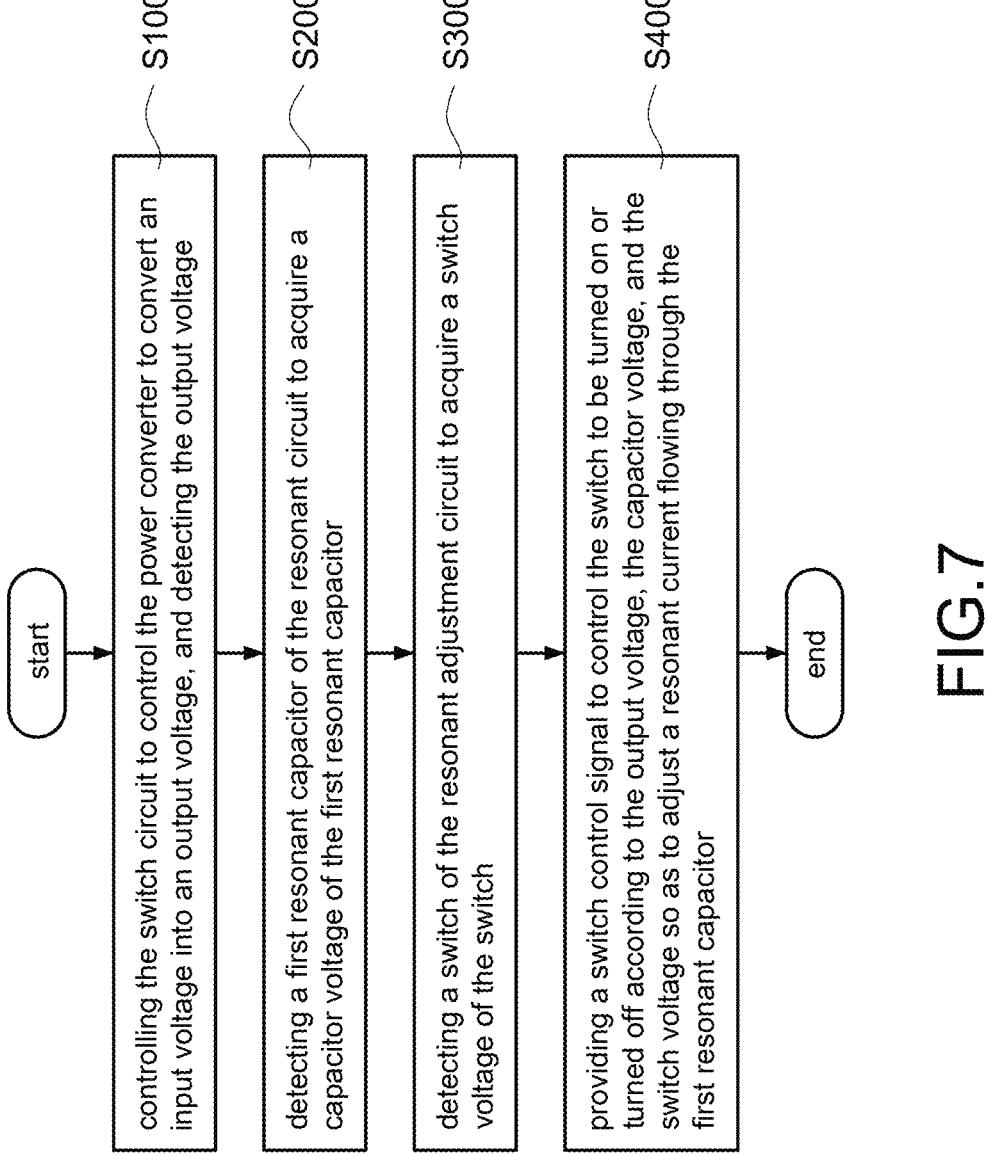
FIG. 7 is a flowchart of a method of operating the asymmetric half-bridge flyback power converter according to the present disclosure.

Please refer to FIG. 7, which shows a flowchart of a method of operating the asymmetric half-bridge flyback power converter according to the present disclosure, and also refer to FIG. 1A to FIG. 6C. The method of operating the power converter 100 is used to control the asymmetric half-bridge flyback power converter, and is mainly used to increase the efficiency of the power converter 100 through a specific control method when the power converter 100 operates in the discontinuous resonant mode.

Specifically, the method includes steps of: controlling the switch circuit to control the power converter to convert an input voltage into an output voltage, and detecting the output voltage (step S100). A preferred implementation is to use the controller 3 to control the switch circuit 12 to control the power converter 100 to convert the input voltage Vin into the output voltage Vo. In addition, the controller 3 detects the output voltage Vo through, for example, but not limited to, a detection circuit (not shown) or a voltage whose voltage change is related to the output voltage Vo (such as but not limited to the auxiliary voltage Vaux, etc.) to realize the magnitude of the output voltage Vo.

Afterward, detecting a first resonant capacitor of the resonant circuit to acquire a capacitor voltage of the first resonant capacitor (step S200). In a preferred embodiment, the controller 3 detects the first resonant capacitor Cr1 of the resonant circuit 14 through, for example, but not limited to, a detection circuit (not shown) to realize the capacitor voltage Vcr1 of the first resonant capacitor Cr1. Afterward, detecting a switch of the resonant adjustment circuit to acquire a switch voltage of the switch (step S300). A preferred implementation is that the controller 3 detects the switch Qcr of the resonant adjustment circuit 4 through, for example but not limited to, a detection circuit (not shown) to realize the switch voltage Vqcr of the switch Qcr.

Afterward, providing a switch control signal to control the switch to be turned on or turned off according to the output voltage, the capacitor voltage, and the switch voltage so as to adjust a resonant current flowing through the first resonant capacitor (step S400). A preferred implementation is to use the controller 3 to calculate a specific duty cycle of turning on the switch Qcr according to the output voltage Vo (for example, but not limited to, the auxiliary voltage Vaux corresponding to the output voltage Vo) and the capacitor voltage Vcr1 to generate the charging control signal Scg. Moreover, the controller 3 also generates the discharging control signal Sdg according to the switching voltage Vqcr. In particular, the charging control signal Scg is mainly a signal that controls the switch Qcr to be turned on when the first switch Q1 is turned on, and the discharging control signal Sdg is mainly a signal that controls the switch Qcr to be turned on when the second switch Q2 is turned on.

Finally, the controller 3 provides the switch control signal Scr according to the charging control signal Scg and the discharging control signal Sdg so as to control the switch Qcr to be turned on and turned off through the switch control signal Scr. Accordingly, the resonant current Icr flowing through the resonant capacitor (i.e., the first resonant capacitor Cr1 and the second resonant capacitor Cr2) can be adjusted, and by adjusting the resonant current Icr, current value when the resonant current Icr and the magnetizing current Ilm intersect is adjusted to approximately equal to the predetermined value Ip. In particular, the detailed control method of the power converter 100 that is not specifically illustrated in FIG. 7 can be inferred by referring to the details in FIG. 1A to FIG. 6C, and will not be described again here.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power converter comprising:
a transformer comprising a primary-side winding, a secondary-side winding, and a magnetizing inductance; the primary-side winding coupled to the secondary-side winding, and the magnetizing inductance connected to the primary-side winding in parallel,
a resonant circuit coupled to the primary-side winding, and the resonant circuit comprising a first resonant capacitor,
a switch circuit comprising a first switch and a second switch, and a node between the first switch and the second switch coupled to the resonant circuit,
a resonant adjustment circuit coupled to the first resonant capacitor, and
a controller coupled to the resonant adjustment circuit, and the controller configured to control the resonant adjustment circuit to adjust a resonant current flowing through the first resonant capacitor according to an output voltage of the power converter so as to adjust a current value when the resonant current and a magnetizing current flowing through the magnetizing inductance intersect to be substantially equal to a predetermined value.

2. The power converter as claimed in claim 1, wherein the resonant adjustment circuit comprises:
a second resonant capacitor coupled to the first resonant capacitor, and
a switch coupled to the second resonant capacitor and the controller,
wherein the controller is configured to control the switch to be turned on for a specific time according to the output voltage so as to adjust the current value to be substantially equal to the predetermined value.

3. The power converter as claimed in claim 2, wherein when the first switch is turned on, the controller is configured to control the switch to be turned on for a first specific time according to the output voltage, and when the second switch is turned on, the controller is configured to control the switch to be turned on for a second specific time.

4. The power converter as claimed in claim 3, wherein the controller is configured to control the switch to be turned on for the specific time according to a junction diode of the switch being forward biased.

5. The power converter as claimed in claim 3, wherein after the controller is configured to wait for a delay time after the switch is turned on for the first specific time, and after the delay time, the controller is configured to control the switch to be turned on for the second specific time.

6. The power converter as claimed in claim 3, wherein the controller is configured to calculate a specific duty cycle according to the output voltage, and control the switch to be turned on for the first specific time according to the specific duty cycle.

7. The power converter as claimed in claim 3, further comprising:
auxiliary winding coupled to the controller, and the auxiliary winding configured to generate an auxiliary voltage corresponding to the output voltage by coupling to the primary-side winding,
wherein the controller is configured to calculate a specific duty cycle according to the auxiliary voltage and a capacitor voltage of the first resonant capacitor, and control the switch to be turned on for the first specific time according to the specific duty cycle.

8. The power converter as claimed in claim 7, wherein the controller comprises:
a computing unit configured to provide a voltage error value according to the auxiliary voltage and the capacitor voltage,
a first comparison unit configured to compare the voltage error value with a first reference voltage to generate an error signal,
a compensation unit configured to compensate the error signal to generate a voltage compensation signal, and
a first AND operation unit configured to perform an and operation on the voltage compensation signal and a first control signal of controlling the first switch to generate a charging control signal,
wherein when the first switch is turned on, the controller is configured to control the switch to be turned on or turned off according to the charging control signal.

9. The power converter as claimed in claim 7, wherein the controller comprises:
a second comparison unit configured to compare a switch voltage of the switch with a second reference voltage to generate a voltage comparison signal, and
a second AND operation unit configured to perform an and operation on the voltage comparison signal and a second control signal of controlling the second switch to generate a discharging control signal,
wherein after the second switch is turned on, the controller is configured to control the switch to be turned on or turned off according to the discharging control signal.

10. The power converter as claimed in claim 2, wherein when the switch is turned off, a capacitance value of an equivalent capacitance of the resonant circuit is a capacitance value of the first resonant capacitor, and when the switch is turned on, the capacitance value is a capacitance value of the first resonant capacitor and the second resonant capacitor connected in parallel.

11. A controller configured to control a power converter comprising a transformer, a resonant circuit, a switch circuit, and a resonant adjustment circuit, the controller comprising:
a first detection terminal coupled to an auxiliary winding, and the auxiliary winding coupled to the transformer to generate an auxiliary voltage, and the first detection terminal acquires an output voltage of the power converter by detecting the auxiliary voltage, a second detection terminal coupled to a switch of the resonant adjustment circuit to detect a switch voltage of the switch, and a control terminal coupled to the switch, and configured to provide a switch control signal to control the switch to be turned on or turned off, wherein the controller is configured to provide the switch control signal according to the auxiliary voltage and the switch voltage to adjust a resonant current flowing through a first resonant capacitor so as to adjust a current value when the resonant current and a magnetizing current flowing through a magnetizing inductance of the transformer intersect to be substantially equal to a predetermined value.

12. The controller as claimed in claim 11, wherein the controller is configured to calculate a specific duty cycle according to the auxiliary voltage, and adjust the switch control signal according to the specific duty cycle so that when a first switch is turned on, the controller is configured to control the switch to be turned on for a second specific time according to the switch control signal.

13. The controller as claimed in claim 11, further comprising:

a third detection terminal coupled to the first resonant capacitor of the resonant circuit, and configured to detect a capacitor voltage of the first resonant capacitor, wherein the controller is configured to provide the switch control signal to adjust the resonant current according to the auxiliary voltage, the capacitor voltage, and the switch voltage.

14. The controller as claimed in claim 13, wherein the controller is configured to calculate a specific duty cycle according to the auxiliary voltage and the capacitor voltage, and adjust the switch control signal according to the specific duty cycle so that when a first switch is turned on, the controller is configured to control the switch to be turned on for a first specific time according to the switch control signal.

15. The controller as claimed in claim 11, wherein the controller is configured to adjust the switch control signal according to the switch voltage so that when a second switch is turned on, the controller is configured to control the switch to be turned on for a second specific time according to the switch control signal.

16. A method of controlling a power converter comprising a transformer, a resonant circuit, a switch circuit, and a resonant adjustment circuit, the method comprising steps of:

controlling the switch circuit to control the power converter to convert an input voltage into an output voltage, and detecting the output voltage, detecting a first resonant capacitor of the resonant circuit to acquire a capacitor voltage of the first resonant capacitor, detecting a switch of the resonant adjustment circuit to acquire a switch voltage of the switch, and providing a switch control signal to control the switch to be turned on or turned off according to the output voltage, the capacitor voltage, and the switch voltage so as to adjust a resonant current flowing through the first resonant capacitor.

17. The method as claimed in claim 16, wherein the power converter further comprises an auxiliary winding, and the auxiliary winding coupled to the transformer to generate an auxiliary voltage, the method further comprises a step of:

detecting the auxiliary voltage to acquire the output voltage corresponding to the auxiliary voltage.

18. The method as claimed in claim 16, further comprising steps of:

calculating a specific duty cycle according to the output voltage, adjusting the switch control signal according to the specific duty cycle, and controlling the switch to be turned on for a first specific time when a first switch of the switch circuit is turned on.

19. The method as claimed in claim 16, further comprising steps of:

calculating a specific duty cycle according to the output voltage and the capacitor voltage, adjusting the switch control signal according to the specific duty cycle, and controlling the switch to be turned on for a first specific time according to the switch control signal when a first switch of the switch circuit is turned on.

20. The method as claimed in claim 16, further comprising steps of:

adjusting the switch control signal according to the switch voltage, and controlling the switch to be turned on for a second specific time according to the switch control signal when a second switch of the switch circuit is turned on.

* * * * *